(12) United States Patent
Dejneka et al.

(10) Patent No.: US 10,626,042 B2
(45) Date of Patent: Apr. 21, 2020

(54) FINING AGENTS FOR SILICATE GLASSES

(71) Applicant: Corning Incorporated, Corning, NY (US)

(72) Inventors: Matthew John Dejneka, Corning, NY (US); Sinue Gomez, Corning, NY (US)

(73) Assignee: CORNING INCORPORATED, Corning, NY (US)

(*) Notice: Subject to any disclaimer, the term of this patent is extended or adjusted under 35 U.S.C. 154(b) by 0 days.

(21) Appl. No.: 14/730,354

(22) Filed: Jun. 4, 2015

(65) Prior Publication Data

US 2015/0266768 A1    Sep. 24, 2015

Related U.S. Application Data

(60) Continuation of application No. 14/146,377, filed on Jan. 2, 2014, now Pat. No. 9,073,779, which is a (Continued)

(51) Int. Cl.
*C03C 1/00* (2006.01)
*C03C 21/00* (2006.01)
(Continued)

(52) U.S. Cl.
CPC .............. *C03C 3/083* (2013.01); *C03B 5/225* (2013.01); *C03B 17/064* (2013.01); *C03C 1/004* (2013.01);
(Continued)

(58) Field of Classification Search
CPC ......... C03B 5/225; C03C 1/004; C03C 3/091; C03C 3/083; C03C 3/087; C03C 3/093
See application file for complete search history.

(56) References Cited

U.S. PATENT DOCUMENTS 3,451,796 A    6/1969  Mochel
3,479,217 A    11/1969 Spanoudis
(Continued)

FOREIGN PATENT DOCUMENTS

CN    1450010 A    10/2003
CN    1546405 A    11/2004
(Continued)

OTHER PUBLICATIONS

Fluegel (Fluegel, A., "Glass viscosity calculation based on a gobal statistical modeling approach", Glass Technol.:Europ. J. Glass Sci. Technol. A, vol. 48, 2007, No. 1, p. 13-30.*
(Continued)

*Primary Examiner* — Jason L Lazorcik
(74) *Attorney, Agent, or Firm* — Dinsmore & Shohl LLP

(57) ABSTRACT

A fining agent for reducing the concentration of seeds or bubbles in a silicate glass. The fining agent includes at least one inorganic compound, such as a hydrate or a hydroxide that acts as a source of water. In one embodiment, the fining agent further includes at least one multivalent metal oxide and, optionally, an oxidizer. A fusion formable and ion exchangeable silicate glass having a seed concentration of less than about 1 seed/cm$^3$ is also provided. Methods of reducing the seed concentration of a silicate glass, and a method of making a silicate glass having a seed concentration of less than about 1 seed/cm$^3$ are also described.

30 Claims, 3 Drawing Sheets

Related U.S. Application Data division of application No. 13/346,235, filed on Jan. 9, 2012, now abandoned, which is a division of application No. 12/392,577, filed on Feb. 25, 2009, now Pat. No. 8,158,543.

(60) Provisional application No. 61/067,130, filed on Feb. 26, 2008.

(51) Int. Cl.
    *C03C 3/087* (2006.01)
    *C03C 3/091* (2006.01)
    *C03C 3/095* (2006.01)
    *C03B 5/225* (2006.01)
    *C03C 3/083* (2006.01)
    *C03C 14/00* (2006.01)
    *C03B 17/06* (2006.01)
    *C03C 3/085* (2006.01)

(52) U.S. Cl.
CPC ............. *C03C 3/085* (2013.01); *C03C 3/087* (2013.01); *C03C 3/091* (2013.01); *C03C 3/095* (2013.01); *C03C 14/008* (2013.01); *C03C 21/002* (2013.01); *Y02A 40/29* (2018.01); *Y10T 428/315* (2015.01)

(56) References Cited

U.S. PATENT DOCUMENTS

| | | | |
|---|---|---|---|
| 3,485,702 A * | 12/1969 | Mochel | C03C 3/083 428/336 |
| 3,524,737 A | 8/1970 | Doyle et al. | |
| 3,617,231 A * | 11/1971 | Fenstermacher | C03B 1/00 501/27 |
| 3,652,303 A | 3/1972 | Janakirama Rao | |
| 3,752,729 A | 8/1973 | Mochel | |
| 3,772,135 A * | 11/1973 | Hara | C03C 3/085 427/399 |
| 3,778,335 A | 12/1973 | Boyd | |
| 3,790,430 A | 2/1974 | Mochel | |
| 3,885,976 A | 5/1975 | Snitzer | |
| 3,914,514 A | 10/1975 | MacKenzie et al. | |
| 3,954,656 A | 5/1976 | Deeg et al. | |
| 3,988,234 A | 10/1976 | Young | |
| 4,015,045 A * | 3/1977 | Rinehart | C03C 3/083 351/159.57 |
| 4,028,131 A | 6/1977 | Pons | |
| 4,033,777 A | 7/1977 | Young | |
| 4,058,437 A | 11/1977 | Young | |
| 4,110,097 A * | 8/1978 | Chevallier | C03B 3/02 501/29 |
| 4,119,760 A * | 10/1978 | Rinehart | C03C 3/085 428/218 |
| 4,138,235 A | 2/1979 | Turner et al. | |
| 4,270,945 A * | 6/1981 | Amrhein | C03C 1/004 501/31 |
| 4,298,389 A * | 11/1981 | Johnson | C03C 3/091 501/77 |
| 4,298,390 A | 11/1981 | Flannery et al. | |
| 4,759,538 A | 7/1988 | Dromigny | |
| 4,919,700 A * | 4/1990 | Pecoraro | C03B 5/20 65/134.2 |
| 4,929,266 A * | 5/1990 | Cozac | C03B 5/03 65/134.5 |
| 5,277,946 A | 1/1994 | Nagai et al. | |
| 5,384,296 A | 1/1995 | Tsao | |
| 5,432,130 A | 7/1995 | Rheinberger et al. | |
| 5,586,999 A * | 12/1996 | Kobayashi | C03B 5/16 65/134.3 |
| 5,618,763 A | 4/1997 | Frank et al. | |
| 5,665,137 A * | 9/1997 | Huang | C03B 5/193 65/134.1 |
| 5,780,371 A * | 7/1998 | Rifqi | C03C 3/076 428/846.9 |
| 5,785,725 A | 7/1998 | Cusick et al. | |
| 5,785,726 A | 7/1998 | Dorfeld et al. | |
| 5,846,280 A | 12/1998 | Speit | |
| 5,895,768 A | 4/1999 | Speit | |
| 5,900,296 A | 5/1999 | Hayashi et al. | |
| 5,908,703 A | 6/1999 | Brix et al. | |
| 5,922,097 A * | 7/1999 | Kobayashi | C03B 5/2356 65/134.1 |
| 6,040,029 A | 3/2000 | Yamamoto et al. | |
| 6,087,284 A | 7/2000 | Brix et al. | |
| 6,096,670 A | 8/2000 | Lautenschlager et al. | |
| 6,128,924 A | 10/2000 | Bange et al. | |
| 6,136,401 A | 10/2000 | Yamamoto et al. | |
| 6,235,667 B1 | 5/2001 | Paloschi et al. | |
| 6,251,812 B1 | 6/2001 | Koyama et al. | |
| 6,253,578 B1 | 7/2001 | Kobayashi et al. | |
| 6,297,182 B1 | 10/2001 | Maeda et al. | |
| 6,306,786 B1 | 10/2001 | Koyama et al. | |
| 6,313,052 B1 * | 11/2001 | Nakashima | C03C 3/085 257/E31.041 |
| 6,333,286 B1 | 12/2001 | Kurachi et al. | |
| 6,365,534 B1 | 4/2002 | Koyama et al. | |
| 6,380,112 B1 | 4/2002 | Kolberg et al. | |
| 6,436,858 B1 * | 8/2002 | Laborde | C03C 3/093 106/38.9 |
| 6,436,859 B1 | 8/2002 | Muramoto et al. | |
| 6,465,381 B1 | 10/2002 | Lautenschlaeger et al. | |
| 6,518,211 B1 | 2/2003 | Bradshaw et al. | |
| 6,588,234 B1 * | 7/2003 | Kiefer | C03B 5/021 65/134.3 |
| 6,607,999 B2 | 8/2003 | Hachitani | |
| 6,627,569 B1 | 9/2003 | Naumann et al. | |
| 6,753,279 B2 * | 6/2004 | Kohli | C03C 3/087 501/66 |
| 6,815,882 B2 | 11/2004 | Murakami et al. | |
| 6,816,576 B2 | 11/2004 | Kasvand et al. | |
| 6,818,576 B2 | 11/2004 | Ikenishi et al. | |
| 6,992,031 B2 | 1/2006 | Naumann et al. | |
| 7,090,937 B2 | 8/2006 | Ikenishi et al. | |
| 7,141,521 B2 | 11/2006 | Siebers et al. | |
| 7,169,470 B2 | 1/2007 | Wolff et al. | |
| 7,232,612 B2 | 6/2007 | Yamamoto et al. | |
| 7,296,441 B2 * | 11/2007 | Leister | C03B 1/02 65/134.1 |
| 7,309,671 B2 * | 12/2007 | Kurachi | C03C 3/087 428/410 |
| 7,491,668 B2 | 2/2009 | Fechner et al. | |
| 7,534,734 B2 | 5/2009 | Ellison | |
| 7,635,521 B2 | 12/2009 | Aitken et al. | |
| 7,666,511 B2 | 2/2010 | Ellison et al. | |
| 7,687,420 B2 | 3/2010 | Murata | |
| 7,709,406 B2 | 5/2010 | Cornelius et al. | |
| 7,742,667 B2 | 6/2010 | Paschal et al. | |
| 7,763,559 B2 | 7/2010 | Kurachi et al. | |
| 7,833,919 B2 | 11/2010 | Danielson et al. | |
| 7,854,144 B2 | 12/2010 | DeLamielleure et al. | |
| 7,908,886 B2 | 3/2011 | Cornelius et al. | |
| 8,075,999 B2 | 12/2011 | Barefoot et al. | |
| 8,076,014 B2 | 12/2011 | Tachiwana et al. | |
| 8,158,543 B2 | 4/2012 | Dejneka et al. | |
| 8,168,295 B2 | 5/2012 | Murata | |
| 8,187,987 B2 | 5/2012 | Amin et al. | |
| 8,232,218 B2 * | 7/2012 | Dejneka | C03B 17/067 428/410 |
| 8,413,466 B2 | 4/2013 | Takaya et al. | |
| 8,431,502 B2 | 4/2013 | Dejneka et al. | |
| 8,623,776 B2 | 1/2014 | Dejneka et al. | |
| 8,652,978 B2 * | 2/2014 | Dejneka | C03C 3/091 501/66 |
| 8,679,631 B2 * | 3/2014 | Murata | C03C 3/083 428/409 |
| 9,073,779 B2 | 7/2015 | Dejneka et al. | |
| 2002/0092325 A1 * | 7/2002 | Muschik | C03B 5/225 65/134.3 |
| 2002/0193232 A1 | 12/2002 | Itoh et al. | |

(56) References Cited

U.S. PATENT DOCUMENTS

| | | | |
|---|---|---|---|
| 2004/0050106 A1* | 3/2004 | Murnane | C03C 1/026 65/134.3 |
| 2004/0063564 A1* | 4/2004 | Kawai | G11B 5/7315 501/68 |
| 2004/0071960 A1 | 4/2004 | Weber et al. | |
| 2004/0075086 A1 | 4/2004 | Wolff et al. | |
| 2004/0186000 A1 | 9/2004 | Kawamoto et al. | |
| 2004/0229744 A1* | 11/2004 | Heithoff | C03B 5/2353 501/72 |
| 2005/0000248 A1* | 1/2005 | Lauten-Schlaeger | C03B 5/193 65/134.1 |
| 2005/0022557 A1 | 2/2005 | Carty | |
| 2005/0065014 A1 | 3/2005 | Narita et al. | |
| 2005/0090377 A1* | 4/2005 | Shelestak | C03C 3/083 501/69 |
| 2005/0209083 A1 | 9/2005 | Takagi et al. | |
| 2005/0250639 A1 | 11/2005 | Siebers et al. | |
| 2006/0006786 A1 | 1/2006 | Fechner et al. | |
| 2006/0150677 A1 | 7/2006 | Kobayashi | |
| 2006/0242995 A1 | 11/2006 | Bookbinder et al. | |
| 2006/0270545 A1 | 11/2006 | Landa et al. | |
| 2006/0293162 A1 | 12/2006 | Ellison | |
| 2007/0022780 A1* | 2/2007 | House | C03B 5/225 65/29.21 |
| 2007/0060465 A1 | 3/2007 | Varshneya et al. | |
| 2007/0149380 A1 | 6/2007 | Dorfeld et al. | |
| 2007/0175241 A1* | 8/2007 | DeLamielleure | C03B 5/225 65/134.4 |
| 2007/0199350 A1 | 8/2007 | Butts et al. | |
| 2007/0227188 A1 | 10/2007 | Carty | |
| 2008/0020919 A1* | 1/2008 | Murata | C03C 3/087 501/66 |
| 2008/0076656 A1* | 3/2008 | Suzuki | C03B 5/225 501/53 |
| 2008/0286548 A1* | 11/2008 | Ellison | C03B 17/06 428/220 |
| 2009/0000335 A1 | 1/2009 | Urata et al. | |
| 2009/0113937 A1 | 5/2009 | Carleer et al. | |
| 2009/0142568 A1 | 6/2009 | Dejneka et al. | |
| 2009/0215607 A1 | 8/2009 | Dejneka et al. | |
| 2009/0266111 A1* | 10/2009 | Nagashima | C03B 1/00 65/134.1 |
| 2010/0035745 A1 | 2/2010 | Murata | |
| 2010/0199721 A1* | 8/2010 | Antoine | C03B 5/225 65/134.9 |

FOREIGN PATENT DOCUMENTS

| | | |
|---|---|---|
| DE | 88633 A | 12/1972 |
| EP | 0253188 A1 | 1/1988 |
| EP | 0444821 A1 | 9/1991 |
| EP | 1653499 A1 | 5/2006 |
| GB | 254377 | 6/1926 |
| GB | 1177248 A | 1/1970 |
| GB | 1322510 A | 7/1973 |
| GB | 1342674 | 1/1974 |
| GB | 1483529 | 9/1974 |
| GB | 2335423 A | 9/1999 |
| JP | 1322510 A | 7/1973 |
| JP | 52-84212 A | 7/1977 |
| JP | 53-108111 A | 9/1978 |
| JP | 58185451 A | 10/1983 |
| JP | 59156506 A | 9/1984 |
| JP | 62-270439 | 11/1987 |
| JP | 63230536 A | 9/1988 |
| JP | 63252938 A | 10/1988 |
| JP | 01122936 A | 5/1989 |
| JP | 07-053235 | 2/1995 |
| JP | H09255354 A | 9/1997 |
| JP | 09301732 A | 11/1997 |
| JP | H09301733 A | 11/1997 |
| JP | 10114529 A | 5/1998 |
| JP | 11029339 A | 2/1999 |
| JP | 11079755 A | 3/1999 |
| JP | H11100226 A | 4/1999 |
| JP | 11180728 A | 7/1999 |
| JP | 11310433 A | 11/1999 |
| JP | 11335133 A | 12/1999 |
| JP | 2000001331 A | 1/2000 |
| JP | 2000072472 A | 3/2000 |
| JP | 2000143281 A | 5/2000 |
| JP | 2000203872 A | 7/2000 |
| JP | 2001076336 A | 3/2001 |
| JP | 2001226138 A | 8/2001 |
| JP | 2001294441 A | 10/2001 |
| JP | 2002025760 A | 1/2002 |
| JP | 2002053340 A | 2/2002 |
| JP | 2002174810 A | 6/2002 |
| JP | 2003203604 A | 7/2003 |
| JP | 2004123496 A | 4/2004 |
| JP | 2004131314 A | 4/2004 |
| JP | 2005089259 A | 4/2005 |
| JP | 2005132713 A | 5/2005 |
| JP | 2005320234 A | 11/2005 |
| JP | 2006137631 U | 6/2006 |
| JP | 2007203604 A | 8/2007 |
| JP | 2007252565 A | 10/2007 |
| JP | 2007252589 A | 10/2007 |
| JP | 2009084075 | 4/2009 |
| JP | 2011076336 A | 4/2011 |
| KR | 20010070063 A | 7/2001 |
| RU | 3784638 | 8/1984 |
| SE | 398104 B | 12/1977 |
| SU | 937373 | 10/1980 |
| SU | 1351897 | 5/1986 |
| SU | 1606477 A1 | 11/1990 |
| SU | 1671625 A1 | 8/1991 |
| WO | 199513993 A1 | 5/1995 |
| WO | 1995013993 A1 | 5/1995 |
| WO | 2007086442 A1 | 8/2007 |
| WO | 20070086441 A1 | 8/2007 |
| WO | 2008062847 A1 | 5/2008 |
| WO | 2009105189 A1 | 8/2009 |
| WO | 2009108285 A2 | 9/2009 |
| WO | 2016185863 A1 | 11/2016 |

OTHER PUBLICATIONS

"Defects in Glass Data Sheet" published by Multiver ltd (http://www.multiver.ca/doc/nosproduits/MULTIVER-Defauts_Verre_EN.pdf)—Accessed Jun. 20, 2017.*

Circular of the Bureau of Standards, Issues 126-164, U.S. G.P.O., 1922 at p. 11.*

Kumar (Kumar, Arun; "Occurrences of Amber Streak & Bubbles in Flint Glass: A Case Study", Asia-Pacific Meeting of Glass and Allied Industries; Dec. 3, 2013, https://aigmf.com/Occurrence%20of%20Seed%20Arun%20Kumar%20D,AGI.pdf).*

Dimbleby et al., "Further Investigations of the Influence of Alumina on the Properties of Glass", Soc. Glass Tecnol. vol. 8, pp. 173-181, 1924.

Dubrovo, "Reaction of Glassy Sodium Silicates and Aluiminosilicates with Aqueous Solutions", Otd. Khim. Nauk, No. 10, pp. 1117-1123, 1958.

Eagan et al., "Effect of Composition of the Mechanical Properties of Aluminosilicate and Borosilicate Glasses", J. Am. Ceram. Soc. vol. 61, No. 1-2, pp. 27-30, Jan.-Feb. 1978.

Enns, "Investigations on the Dependency of the Relative Susceptibility of Glass to Attack by Water on its Chemical Composition", Glastech Ber. vol. 5, No. 11, p. 509, 1927.

Epel'Baum et al., "Molar Volumes and Refractive Indices of Water-Containing Aluminosilicate Glasses", Steklo, No. 2, p. 65, 1978.

Fuxi et al, "Physical Properties of Glasses Containing Several Glass-Forming Oxides", Journal of Non-Crystaline Solides, vol. 80, No. 103, pp. 468-473, 1986.

Gehlhoff et al., "The Physical Properties of Glasses on the Basis of their Composition", Zeitschrift Fuer Technische Physik, vol. 7, No. 3, 1926.

(56) References Cited

OTHER PUBLICATIONS

Gehrke et al., "Influence of Surface Corrosion Processes on the Strength and Fatigue Behavior of Silicate Glasses", Silikattechnik, vol. 38, No. 1, pp. 10-13, 1987.
Hall, "The Influence of Chemical Composition on the Physical Properties of Glazes", J. A. Ceram. Soc., vol. 13, No. 3, pp. 182-199, 1930.
Hoffman et al., "A Survey of the Effect of Composition on the Internal Friction of Glass", The Glass Industry, vol. 38, No. 2, pp. 81-85, Feb. 1957.
Honigmann, "On the Processes During the Acid Matting of Glasses", Glastechn. Ber. vol. 10, No. 3, pp. 154-182, 1932.
Ioffe, "The Electrical Properties of Aluminosilicates", Silikattachen, vol. 10, No. 12, pp. 599-601, 1959.
Ioffe, "Electroconductivity of Sodium-Aluminum-Silicate Glasses", Fizika tverdogo tela, vol. 2, No. 3, pp. 509-516, 1960.
Ioffe, "Nature of the Dielectric Loss in Soda-Alumina Silicate Glasses", Zh. Tekhn. Fiz, vol. 27, No. 5, p. 1454, 1957.
Isard et al., "Influence of Alkaline Earth Ions on the Corrosion of Glasses", Physics and Chemistry of Glasses, vol. 27, No. 2, pp. 55-58, Apr. 1986.
Ivanovskaya et al., "Concentration Distribution and Interdiffusion of Ions in Surface Layers of Sodium Aluminosilicate Glasses Treated with Aqueous Solutions", Fizika I khimiya Stela, vol. 8, No. 5, pp. 582-588, 1982.
Izumitani, "Optical Glass", Am. Inst. Phys. Transl. Ser., pp. 136-146, 1986.
Keppeler et al., "Contribution to the Knowledge of Alumina Glasses", Glastechn. Ber. vol. 11, No. 11, pp. 392-396, 1933.
Keshishyan et al., "Synthesis of Liquidating Iron-Containing Semiconductor Glasses", Steklo, No. 1, p. 28, 1976.
Kostanian et al., "The Influence of $Al_2O_3$ on the Electroconductivity of Sodium-Borate and Sodium-Silicate Glasses", Arm. Khim. Zh, vol. 27, No. 7, pp. 547-552, 1974.
Kuznetsova et al., "Effect of the Composition of Complex Silicate Glasses on Water and Gas Leaching", Fizika i khimiya Stekla, vol. 15, No. 2, pp. 245-251, 1989.
Lange, "A revised model for the density and thermal expansivity of $K_2O$—$Na_2O$—$CaO$—$MgO$—$Al_2O_3$—$SiO_2$ liquids from 700 to 1900 K: extension to crustal magmatic temperatures", Contrib Mineral Petrol., vol. 130, No. 1, pp. 1-11, 1997.
Lange et al., "Densities of $NaO$—$K_2O$—$CaO$—$MgO$—$FeO$—$Fe_2O_3$—$Al_2O_3$-$TiO_2$—$SiO_2$ liquids: New measurements and derived partial molar properties", Geochim. Cosmochim. Acta, vol. 51, pp. 2931-2946, 1987.
Lapp et al., "The Mixed Alkali Effect in Lithium-Sodium Aluminosilicate Glasses", Journal of Non-Crystaline Solids, vol. 95-96, pt II, pp. 889-896, 1987.
Leko, "Influence of $Al_2O_3$ on the Electrical Properties and Structure of Various Alkali Silicate Glasses", Neorganicheskie Materialy, vol. 4, No. 1, pp. 121-124, Jan. 1968.
Leko, "Influence of Composition and Temperature on the Absorption Band Intensity for Water in Alkali Silicate Glasses", Glass Physics and Chemistry, vol. 23, No. 3, pp. 214-224, 1997.
Lisenekov, "Order of Formation of Aluminosilicate and Titanosilicate Polyanions in the Formation of Glass", Fizika i khimiya Stekla, vol. 9, No. 4, pp. 426-431, 1983.
Matusita et al., "Low Expansion Copper Aluminosilicate Glasses", Journal of Non-Crystalline Solids, vol. 30, No. 3, pp. 285-292, 1979.
Matusita et al., "Photoelastic Effects in Silicate Glasses", J. Am. Ceram. Soc., vol. 67, No. 10, pp. 700-704, Oct. 1984.
Muller et al., "Electrical Conductivity of MeO-containing sodium aluminosilicate glasses", Silikattechnik, vol. 32, No. 4, pp. 117-118, 1981.
Muller et al., "On the Mechanism of Alkali Ion Transport in Glasses", Silikattechnik, vol. 32, No. 2, pp. 55-56, 1981.
Murashova et al., "Alkali Resistance of Glasses in the $Na_2O$—$Al_2O_3$—$SiO_2$ System with Additions of Oxides of Alkali Metal and Zink", Fizika i Khimiya Stekla, vol. 9, No. 3, pp. 336-338, May-Jun. 1983.
Myuller, "Electrical Properties and Structure of Glass", The Structure of Glass, vol. 4, Elektricheskie Svoistva i Stroenie Stekla, p. 51, 1964.
Myuller et al., "The Ionic Conductivity of Alkali Aluminosilicate Glasses", Zhurnal Prikladoni Khimii, vol. 36, No. 6, pp. 1192-1199, Jun. 1963.
Nelson et al., "Partial Molar Volumes of Oxide Components in Silicate Liquids", Contrib. Mineral. Petrol., vol. 71, No. 2, pp. 117-124, 1979.
Rencker, "Dilatometric Study of Several Ternary Glasses", Chemical Society, Soc. Chim. France Mem. Ser. 5, vol. 2, No. 8-9, pp. 1389-1407, May 8, 1935.
Rencker, "Weekly Reports on the Proceedings of the Academy of Sciences", C.R. Acad. Sci (Compt.rend), vol. 199, No. 21, p. 1114, 1934.
Riebling, "Electrical Conductance Study of Na Ion Mobility in Silicogermanate, Aluminogermanate, and Aluminosilicate Melts", Journal of the Electrochemical Society, vol. 113, No. 9, pp. 920-926, 1966.
Riebling, "Structural Similarities Between a Glass and Its Melt", J. Am. Ceram. Society, vol. 51, No. 3, pp. 143-144.
Riebling, "Structure of Sodium Aluminosilicate Melts Containing at Least 50 mole % $SiO_2$ at 1500 degrees C", Joural of Chemical Physics, vol. 44, No. 8, pp. 2857-2865, Apr. 15, 1966.
Sakamura et al., "Relaxation elements in internal friction of mixed alkali aluminosilicate glass", J. Ceram. Soc. Jpn. vol. 93, No. 4, pp. 165-169, 1985.
Sakka et al., "Strengthening of Glass by Alkali-Copper Ion Exchange", Journal of Non-Crystalline Solids, Voo. 37, No. 1, pp. 139-141, 1980.
Sakka et al., "Viscosities of Mixed Alkali Aluminosilicate Glasses of the System $Li_2O$—$Na_2O$—$Al_2O_3$—$SiO_2$", Res. Rep. Fac. Eng. Mie Univ, vol. 6, pp. 81-92, 1981.
Schairer et al., "The System $Na_2O$—$Al_2O_3$—$SiO_2$", American Journal of Science, vol. 254, No. 3, pp. 129-195, Mar. 1956.
Kou et al., "Effect of $Al_2O_3$ on Viscosity of Silicates", Journal of Japan Metal Society (1978), vol. 42, No. 8.
Kolitsch et al., "Alkali Ion Mobility in Alkaline Earth Sodium Aluminosilicate Glasses", Silikattechnik 33 (1982) Heft 11, pp. 343-344.
Scholze, "Gases and Water in Glass", Part Two; Institute for Glass and Ceramics, University of Berlin, Lectures on Glass and Technology Rensselaer Polytechnic Institute, Troy, N.Y, Mar. 30-Apr. 1, 1966, pp. 622-628.
Hahnert et al., "Chemical Stability of Strengthened Glasses", Silikattechnik 33 (1982), No. 88, pp. 233-236.
Gehloff et al., "The Physical Properties of Glasses as a Function of the Composition", Zeitschr. f. techn. Physik., 1936 No. 6, pp. 260-278.
Lee et al., "Structural Evolution During $Cu^+/Na^+$ ion-exchange in the system $Na_2O$—$Al_2O_3$—$SiO_2$", Journal of Non-Crystalline Solids, 246 (1999) 83-89.
Muller et al., "The Chemical Resistance to Aqueous Media of Sodium Aluminosilicate Glasses Having an Alkaline Earth Oxide Additive", Wiss, Ztschr. Friedrich-Schiller-Univ. Jena, Naturwiss, R., 34 (5-6) 755-760, 1985.
Stepanov, "Magnetic Properties of Glass Containing Iron Oxide", State Committee on Science and Technology of the Council of Ministers of the USSR, Vitreous State, vol. V, Edition 1, 1970.
Vargin et al., "Magnetochemical Study of Glasses Containing Bivalent Manganese Ions", Translated from Zhurnal Prikladnoi Khimii, vol. 45, No. 3, pp. 654-656, Mar. 1972.
Cooper, "Strengthening of Glass Fibers: II, Ion Exchange", Case Western Reserve University, Cleveland, Ohio 44106, p. 665-669, 1969.
Haider et al., "The Diffusion of 'Water' Into Some Simple Silicate and Aluminosilicate Glasses at Temperatures Near the Transformation Range", Glass Technology vol. 11 No. 6, Dec. 1970.

(56) References Cited

OTHER PUBLICATIONS

Hunold et al., "Chemical Diffusion of Sodium and Aluminum Ions in Sodium Aluminosilicate Melts", Glastechn, Ber. 53 (1980) No. 8, pp. 207-219.
Belyustin et al., "The Distribution of Sodium in the Surface Layers of Sodium Aluminosilicate Glasses", Fizika i khimiya stekla, vol. 1, No. 4, 1975, pp. 358-363.
Schairer et al., "The Nature of Residual Liquids From Crystallization With Data on the System Nepheline-Diopside-Silica", American Journal of Science, Bradley Volume, vol. 258-A, 1960, P. 273-283.
Webb et al, "Configurational Heat Capacity of $Na_2O$—CaO—$Al_2O_3$—$SiO_2$ Melts", Chemical Geology 256 (2008) 92-101.
Orgaz et al., "Prediction of Results of Strengthening Glass by Using the Misfitting Sphere Theory", Proceedings of a NATO Advanced Research Workshop entitled Strength of Glass, held Mar. 21-25, 1983, in Algarve, Portugal.
Keller, "The Dielectric Constant of Glasses as a Function of the Glass Composition", Zeitschr. f. tech. Physik., No. 5, 1932, pp. 237-239.
White, "Surface Chemistry and Dissolution Kinetics of Glassy Rocks at 25 Degrees", Lawrence Berkeley Laboratory, University of California, Berkeley, CA 94720; Geochimica et Cosmochimica Acta vol. 47, 805-815, 1983.
Inaba et al., "Young's Modulus and Compositional Parameters of Oxide Glasses," J. Am. , Ceram Soc. 82 (12) 3501-507 (1999).
Toplis et al., "The Variable Influence of P2O5 on the Viscosity of Melts of Differing Alkali/Aluminum Ratio: Implications for the Structural Role of Phosphorus in Silicate Melts", Geochimica et Cosmochimica Acta, vol. 60, No. 21, pp. 4107-4121, 1996.
Gottsmann et al., "Predicting Shear Viscosity During Volcanic Processes at the Glass Transition: A Calorimetric Calibration", Earth and Planetary Science Letters 198 (2002) 417-427.
Romano et al., "The Viscosities of Dry and Hydrous $XAlSi_3O_8$ (X=Li, Na, K, Ca05 MG05) Melts", Chemical Geology 174 (2001) 115-132.
Giordano et al., "Viscosity of a Teide Phonolite in the Welding Interval", Journal of Volcanology and Geothermal Research 103 (2000) 239-245.
Yano, et al., "Ionic Conduction and Dielectric Relaxation in $Ag^+$ / $Na^+$ Ion-Exchanged Aluminosilicate Glasses: Mixed Mobile Ion Effect and KWW Relaxation", Solid State Ionics 150 (2002) 281-290.
Yano, et al., "Cation Site Occupation by $Ag^+$/$Na^+$ Ion-Exchange in $R_2O$—$Al_2O_3$—$SiO_2$ Glasses", Journal of Non-Crystalline Solids 270 (2000) 163-171.
Shen et al. "Control of Concentration Profiles in Two Step Ion Exchanged Glasses", Physics and Chemistry of Glasses vol. 44 No. 4 Aug. 2003, pp. 284-292.
Boyd et al., Encyclopedia of Chemical Technology, "Glass", vol. 11, 3rd ed., pp. 807-880, 1989.
Husung, et al., "The Infrared Transmission Spectra of Four Silicate Glasses Before and After Exposure to Water", 1990 Materials Research Society, J. Meter Res., vol. 5, No. 10, Oct. 1990, pp. 2209-2217.
Roskosz, et al., "The Structural Role of Ti In Aluminosilicate Liquids in the Glass Transition Range: Insights From Heat Capacity and Shear Viscosity Measurements", Geochimica et Cosmochimica Acta, vol. 68, No. 3, pp. 591-606 (2004).
Dingwell et al., "Extremely Fluid Behavior of Hydrous Peralakline Rhyolites", Earth and Planetary Science Letters 158 (1998) 31-38.
Giordana et al., Glass Transition Temperatures of Natural Hydrous Melts: A Relationship With Shear Viscosity and Implications for the Welding Process, Journal of Volcanology and Geothermal Research 142 (2005) 105-118.
Russel et al., "The Effect of Glass Composition on the Thermodynamics of the $Fe^{2+}$ / $Fe^{3+}$ Equilibrium and the Iron Diffusivity in $Na_2O$/MgO/CaO/$Al_2O_3$/$SiO_2$ Melts", Chemical Geology 213 (2004) 125-135.

Lee et al., "Structure and Properties of Ion-Exchanged $Na_2O$—$Cu_2O$—$Al_2O_3$—$SiO_2$ Glass System", Journal of Non-Crystalline Solids 222 (1997) 120-124.
Wiedenroth et al., "The Effect of MgO on the Diffusivity of Iron and the Incorporation of Iron in Soda-Magnesia-Aluminosilicate Melts", Journal of Non-Crystalline Solids 347 (2004) 180-186.
Capobianco et al., "Calorimetric Evidence for Ideal Mixing of Silicon and Germanium in Glasses and Crystals of Sodium Feldspar Composition", American Mineralogist, vol. 67, pp. 718-724, 1982.
Carl et al., The Effect of Composition on UV-vis-NIR Spectra of Iron Doped Glasses in the Systems $Na_2O$/MgO/$SiO_2$ and $Na_2O$/MgO/$Al_2O_3$/$SiO_2$, Science Direct, Journal of Non-Crystalline Solids 353 (2007) 244-249.
Zimova et al., "The Combined Effects of Chlorine and Fluorine on the Viscosity of Aluminosilicate Melts", ScienceDirect, Geochimica et Cosmochimica Acta 71 (2007) 1553-1562.
Cook, "Direct Observation and Analysis of Indentation Cracking in Glasses and Ceramics", J. Am. Ceram. Soc, 73 (4) 787-817 (1990).
Murata et al., "Matrix Effect on Absorption and Infrared Fluorescence Properties of Bi Ions in Oxide Glasses", ScienceDirect, Journal of Non-Crystalline Solids 353 (2007) 2403-2407.
Sierralta et al., "The Influence of Bulk Composition on the Diffusivity of Carbon Dioxide in Na Aluminosilicate Melts", American Mineralogist, vol. 87, pp. 1710-1716, 2002.
Webb et al., "Anomalous Rheology of Peraluminous Melts", American Mineralogist, vol. 89, pp. 812-818, 2004.
Zimova et al., "The Effect of Chlorine on the Viscosity of $Na_2O$—$Fe_2O_3$—$Al_2O_3$—$SIO_2$ Melts", American Mineralogist vol. 91, pp. 344-352, 2005.
Stoch et al., "Thermal Study of the Influence of Chemical Bond Ionicity on the Glass Transformation in ($Na_2O$, CaO, MgO)—$Al_2O_3$—$SiO_2$ Glasses", Journal of Thermal Analysis and Calorimetry, vol. 77 (2004) 57-63.
Noonan et al., "Formation and Properties of Sodium Praseodymium Silicate Glasses", Phys. Chem. Glasses: Eur. J. Glass Sci. Technol B., Apr. 2007, 48 (2), 79-84.
Nogami et al., "Redox Equilibrium of Samarium Ions Doped in $Al_2O_3$—$SiO_2$ Glasses", Journal of Luminescence 124 (2007) 291-296.
Shelby, "Helium Migration in Sodium Aluminosilicate Glasses", J. Am. Ceram. Soc. vol. 59, No. 9-10, pp. 420-425, Sep.-Oct. 1976.
Spierings, "Compositional Effects in teh Dissolution of Multicomponent Silicate Glasses in Aqueous HF Solutions", J. Mater. Sci., vol. 26, No. 12, pp. 3329-3336, 1991.
Spierings, "The near Infared Absorption of Water in Glasses", Physics and Chemistry of Glasses, vol. 23, No. 4, pp. 129-134, Aug. 1982.
Tamura, "A Study of the Minor Constituents of Borosilicate Glasses", Atti III Congresso Inter.del Vetro, Roma, p. 426, 1954.
Tanube et al., "Local structure and 1.5um quantum efficiency of erbium doped glasses for optical amplifiers", Journal of Non-Crystalline Solids, vol. 196, pp. 101-105, 1996.
Taylor et al., "Properties of Soda Aluminosilicate Glasses: V, Low-Temperature Viscosities", J. Am. Ceram. Soc., vol. 53, No. 12, pp. 692-695, 1970.
Tsekhomskii et al., "The Nature of the Conduction of Aluminosilicate Glasses", Fizika tverdogo Tela (Solid State Physics), vol. 5, No. 2, pp. 586-589, 1963.
Vargin et al., "Acid Resistance of Glasses in the High-Silica Region of the System $R_2O$—$Al_2O_3$—$Sio_2$", Zhurnal Prikladnoi Khimii, vol. 44, No. 5, pp. 1173-1175, May 1971.
Vargin et al., "Acid Resistance of Low-Alkali Zinc Aluminosilicate Glasses", Zhurnal prikladnoi Khimii, vol. 46, No. 3, pp. 641-644, Mar. 1973.
Vargin et al., "Glass Formation and Properties of Glasses of the System $Na_2O$—$ZrO_2$—$SiO_2$", Zhurnal Prikladnoi Khimii, vol. 37, No. 6, pp. 1369-1371, Jun. 1963.
Wakabayashi et al., "Effects of trivalent oxides on electrical conductivity in alkali silicate glasses", Journal of the Ceramic Society of Japan, vol. 93, No. 4, pp. 209-216, 1985.
Office Action pertaining to U.S. Continuation U.S. Appl. No. 13/495,355 dated Jan. 2, 2013.

(56) References Cited

OTHER PUBLICATIONS

Office Action pertaining to Japanese Patent Application 2010-548676 dated Oct. 30, 2012.
Office Action pertaining to Chinese Patent Application No. 200980111940.5 dated Aug. 31, 2012.
European Application No. 09716064.2 Search Report dated Feb. 14, 2013.
Office Action pertaining to U.S. Appl. No. 13/495,355 dated Aug. 24, 2012.
Election/Restriction pertaining to U.S. Appl. No. 13/346,235 dated Jun. 8, 2012.
Office Action pertaining to U.S. Appl. No. 13/346,235 dated Jul. 24, 2012.
Office Action pertaining to U.S. Appl. No. 13/346,235 dated Nov. 7, 2012.
Japanese Office Action pertaining to Application No. 2010-548676 dated Mar. 21, 2012.
Fujita et al., "Influence of Refining Agent in Soda Lime Glass for Ultraviolet Ray Transmittance", Matrials Transactions, vol. 49, No. 2, pp. 372-375, Jan. 17, 2008—http://www.jim.or.jp/journal/e/pdf3/49/02/372.pdf.
Jenkins et al., "Final Report, Preliminary Investigation into the Vitrification of Salts from Evaporated Drain Water", Oct. 1998—http://jenkins.ucdavis.edu/projects/Salt/SaltVitrificationFinalReport.pdf.
Kloss et al., "Advances in the process of floating borosilicate glasses and some recent applications for specialty borosilicate float glasses", Glass Technology, vol. 41, No. 6, pp. 177-181, Dec. 2000.
International Preliminary Report on Patentability and Search Report pertaining to Application No. PCT/US09/01063 dated Feb. 4, 2010.
Decision of Rejection pertaining to Application No. 2010-548676 dated Oct. 30, 2012.
Makishima et al., "Thermal Expansions and Chemical Durabilities of Yttria-Aluminosilicate Glasses Containing Na2O and ZrO2", Communications of the American Ceramic Society, vol. 74, No. 2, pp. 428-430, 1991.
R. R. Wusirika, "Oxidation Behavior of Oxynitride Glasses", Communications of the American Ceramic Society, vol. 68, No. 11, pp. C294-C297, 1985.
Weberbauer, "On the Acid Resistance of Glass in Dependence of its Chemical Composition and on the Weathering of Glass", Communication from the Glass Technology Laboratory of Osram, GmbH, limited partnership, Weibwasser/Oberlausitz Branch).
Scholze, "The Incorporation of Water in Glasses", (Communication from the Max Planck Institute for Silicate Research, Wurzburg); Submitted on Jan. 21, 1959.
Keppeler et al., "On the Knowledge of Alumina Glasses", (Communication from the Laboratory for Glass Technology and Ceramics at the Terminal College Hannover), Submitted on Aug. 28, 1933.
Enss, Investigation of the Dependence of the Relative Moisture-Susceptibiity of Glass on Its Chemical Composition, (Conductrd in the Chemistry Department of the Glass Technology Laboratory of Osram, GmbH, limited partnership, WeiBwasser/Oberlausitz Plant), by Grade Eng. Johann Enss.
Enss, Investigation of the Dependence of the Relative Moisture-Susceptibiity of Glass on Its Chemical Composition, (Conducted in the Chemistry Department of the Glass Technology Laboratory of Osram, GmbH, limited partnership, WeiBwasser/Oberlausitz Plant), by Grade Eng. Johann Enss (submitted Oct. 4, 1927).
Bezborodov et al., "Ziroconium and Lithium Glaze Production Practices and a Study of Glaze Properties," Administration for the Manufacturing of Construction Materials, Economic Council of the Belarusian Soviet Socialist Republic, The City of Minsk, 1959.
Dyshlova et al., "On the Interrelation Between the Composition, Structure and Thermal Expansion of Silicate and Aluminoslilicate Glass." Academy of Sciences of the Kazakh SSR, Editorial Board of the Journal of Proceedings of the Academy of Science of the Kazakh SSR, UDS 666.II.01, Report 3.
Ioffe, "On the Nature of Dielectric Attenuation in Aluminosilicate Glass".
Kheifets, "Dependence of Certain Zirconium Glass and Enamel Properties of Their Composition," Ministry of Higher and Specialized Secondary Education of Russian Soviet Federative Socialist Republic, Abstract of a Candidate of Technical Sciences thesis, Leningrad 1965.
Epelbaum, "Molar Volumes and Refractive Indices of Aluminosilicate Glass Which Contains Water".
Pavlushkin et al., "Effects of Glass Composition on Its Chemoresistance and Microhardness in the NA2O—Mgo—A1203—SIO2 System", UDC 666.117.4+666.11.016.22, Chemistry and Technology of Industrial Silicates, Moscow—1980.
Dubrovo et al., "Physical and Chemical Properties of Glass in the Na20—Al203—Ga2O3—SIO2 System", Academy of Science of the USSR, Department of General and Technical Chemistry, Editorial Board of the Journal of the Applied Chemistry, "Nauka" Publishing Company, Moscow 1965 Leningrad.
Dubrovo, "Composition of Studied Sodium Aluminosilicates, in Mole Percent", Interaction of Glassy Sodium Silicates and Sodium Aluminosilicates With Aqueous Solutions, Report 8. Effects of Acid Solutions on Glassy Sodium Aluminosilicates With a Fluctuating Oxygen Number.
Appen, Thesis, 1952.
Dyshlova, Thesis, 1981.
Fritz-Schmidt et al.,"The Physical Properties of Glasses as a Function of the Composition", Z.techn.Physik, vol. 11, No. 8, p. 289, 1930.
Gan, Thesis, 1959.
Gehlhoff et al., "The Physical Properties of Glasses in Dependence on the Composition", Z. techn. Physik, vol. 6, No. 10, p. 544, 1925.
Gehlhoff, "The Physics of Glass", Glastech.Ber., vol. 6, No. 8, p. 410, 1928.
Heckman et al., "Sodium diffusion and electrical conductivity in sodium-aluminosilicate and sodium-calcium-aluminosilicate glasses", Physics and Chemistry of Glasses, vol. 8, No. 4, pp. 145-150, Aug. 1967.
Ivanov, Thesis, 1972.
Kutateladze et al., "The Effect of Al2O3 on the Conductivity of Alkali Silicate Glasses", Tr. Tbilis.Gos.NII Stroit. Mater, vol. 4, p. 89, 1971.
Leko, Thesis, 1965.
Morris, et al., "Indentation crack initiation in ion-exchanged aluminosilicate glass", Journal of Material Science, vol. 39, pp. 2399-2410, 2004.
Sarkisov, "Dependence of the Properties of Glasses of the Magnesium Aluminosilicate System on the Corrdination State of the Components", Proceedings of State Scientific Research Institute of Glass of Moscow Chemical Engineering Institute, No. 142, Moscow, pp. 91-96, 1986.
Zarubina, Thesis, 1975.
Office Action for Chinese Patent Application No. 200980111940.5 dated May 9, 2013.
Paper Hearing for Japanese Patent Application No. 2010-548676 dated Aug. 20, 2013.
Ainsworth et al., "The Diamond Pyramid Hardness of Glass in Relation to the Strength and Structure of Glass. Part II", J. Soc. Glass Technol., vol. 38, No. 185, pp. 501-535, 1954.
Ainsworth et al., "The Diamond Pyramid Hardness of Glass in Relation to the Strength and Structure of Glass. Part III", J. Soc. Glass Technol., vol. 38, No. 185, pp. 536-548, 1954.
Alev et al., "Interdiffusion of Cations and the Change in teh Refractive Index in Gallosilicate and Gallogermanate Glasses", Institute of Silicate Chemistry, Academy of Sciences of the USSR, vol. 15, No. 2, pp. 239-244, Feb. 16, 1988.
Alexander et al,. "Structure of Alkali (Alumino) Silicate Glasses", Journal of Non-Crystaline Solids, vol. 79, pp. 137-154, 1986.
Appen et al, "Electrical Properties of Alumosilicate, Borosilicate and Alumoborosilicate Glasses", Institute of Silicate Chemistry, Translated from Fizika Tverdogo Tela vol. 1, No. 10, pp. 1529-1537, Oct. 1959.
Bekishev et al., "Alkali resistance of four-component sodium silicate glasses containing the oxides al2o3, sno2, and zro2", Translated from Fizika i Khimiya Stekla, vol. 4, No. 2, pp. 225-232, 1978.

(56) References Cited

OTHER PUBLICATIONS

Office Action dated Nov. 5, 2014 pertaining to Chinese Divisional Application No. 201310027639.4.
Communication pursuant to Article 94(3) EPC pertaining to European Patent Application No. 12178879.8 dated May 5, 2014.
Office Action pertaining to European Application No. 09716064.2 dated Feb. 11, 2015.
Japanese Office Action dated May 7, 2014 pertaining to Japanese Patent Application No. 2012-162482.
Japanese Final Office Action dated Mar. 31, 2015 pertaining to Japanese Patent Application No. 2012-162482.
Korean Office Action pertaining to Application No. 10-2010-7021327 dated May 19, 2015.
Carroll et al.; "The solubility of H2O in Phonolitic Melts", America Mineralogist vol. 82, pp. 549-556, 1997.
Dubrovo, "The heat resistance and high-temperature strength of silicate glasses", Neorganicheskie Materialy, vol. 1 No. 6, pp. 973-978, Jun. 1965.
Holand et al., "Surface Crystallization of Leucite in Glasses", Journal of Non-Crystalline Solids, 180 (1995) 292-307.
Itai et al., "The electrical conductivity of Na2O—SiO2—Al2O3 and BaO—SiO2—Al2O3 melts", Bull. Kyushu Inst. Technol. Sci. Technol., No. 41, p. 95-101 1980.
Kranich et al., "Influence of different conditions of measurements on the Knoop Micro-hardness of glasses", Glastechnische Berichte, vol. 49, No. 6, pp. 135-143, 1976.
Lee et al, "EXAFS Study on the Local Environment of Cu+ Ions in Glasses of the Cu2—O—Na2O—IAl2O3—SiO2 System Prepared by Cu+ / Na+ Ion Exchange", Journal of Non-Crystalline Solids, 277 (2000) 155-161.
Schmidt, "Water Solubility in Phonolite Melts: Influence of Melt Composition and Temperature", Chemical Geoplogy 256 (2008) 259-268.
Wakabayashi et al., "The Relationship Between Composition and Electrical Conductivity in Glasses Containing Network Forming Trivalent Cations", Physics and Chemistry of Glasses, vol. 30, No. 2, pp. 51-54 (1989).
Weberbauer, "On the acid resistance of glass as a funtion of its chemical composition and on the weathering of glass", Glastehische Berichte (Glass Technology Reports), vol. 10, No. 7, pp. 361-374, Jul. 1932.
Wedding, "Measurements of High-Temperature Absorption Coefficients of Glasses", Journal of the American Ceramic Society, vol. 58, No. 3-4, pp. 102-105, Mar.-Apr. 11975.
Wilding et al., "Evaluation of a Relaxation eospeedometer for Volcanic Glasses", Chemical Geology 125 (1995) 137-148.
Williams et al., "Sodium diffusion in soda-lime-aluminosilicate glasses" Physics and Chemistry of Glasses, vol. 5, No. 6, pp. 166-171, Dec. 6, 1964.
Yoko et al, "Hydration of silicate, phosphate and borate glasses in an autoclave", Riv. Staz. Sper. Vetro, vol. 14, No. 5, pp. 99-194, 1984.
Yoko et al., "Hydration of Silicate Glasses by Water Vapor at High Temperature" Glastech. Ber. vol. 56K, pt 1, pp . 650-655, 1983.
Notice on Grant of Patent Right for Invention dated Jun. 12, 2016 pertaining to Chinese Patent Application No. 201310027639.4.
Glass Engineering Handbook, "Chapter 2: Charification and Gas Solubility". Japan, Asakura-shoten, Jul. 5, 1999, 4 pgs.
JP2015237329 Office Action dated Oct. 11, 2016, Japan Patent Office.
EP16195343.5 Extended Search Report dated May 29, 2017; 15 Pages; European Patent Office.
English Translation of JP2015237329 Office Action dated Mar. 13, 2018, Japan Patent Office, 10 Pgs.
Chikao Tanaka, "2. Fining and Solubility of Glass", Engineering Handbook, Japan, Asakura Shoten Inc., Jul. 5, 1999, 1st Ed. pp. 226-238. ISBN: 4-254-25238-2.
U.S. Appl. No. 14/730,354, Final Rejection dated Apr. 17, 2018. 20 pgs.
Shelby, James E., Introduction to glass science and technology, Royal Society of Chemistry, 2005, 25 pages, Cambridge, United Kingdom.
Lange, Joachim, Rohstoffe der Glasindustrie, VEB Deutscher Verlag fur Goundstoffindustrie, 1980, 11 pages, Leipzig, Germany.
Jebsen-Marwedel et al., Glastechnische Fabrikationsfehler, Deutschen Glastechnischen Gesellschall, 1980, 5 pages, Frankfurt, Germany.
Noelle, Gunther, Technik der Glasherstellung, Die Deutsche Bibliothek—CIP-Einheitsaufnahnn, 1997, 3 pages, Germany.
EP09716064.2 Communication of a Notice of Opposition, dated Mar. 5, 2018, European Patent Office, 29 pgs.
English Translation of Japanese Patent Application No. JP2015237329 Office Action dated Dec. 5, 2018, Japan Patent Office, 6 Pgs.
Jebsen-Marwedel et al., Glastechnische Fabrikationsfehler, Deutschen Glastechnischen Gesellschaft,1980, 5 pages, Frankfurt, Germany.
Noelle, Gunther, Technik der Glasherstellung, Die Deutsche Bibliothek—CIP-Einheitsaufnahm, 1997, 3 pages, Germany.
European Office Action issued in corresponding European Patent Application No. 2262741, dated Feb. 23, 2018, 28 pages.

* cited by examiner

FINING AGENTS FOR SILICATE GLASSES

CROSS-REFERENCE TO RELATED APPLICATIONS

This application is a continuation of U.S. application Ser. No. 14/146,377 filed Jan. 2, 2014, which is a divisional of U.S. application Ser. No. 13/346,235, filed Jan. 9, 2012, which is a divisional of U.S. application Ser. No. 12/392,577 (now U.S. Pat. No. 8,158,543), and claims the benefit of U.S. Provisional Application Ser. No. 61/067,130 filed on Feb. 26, 2008, the contents of which are incorporated by reference herein in their entirety.

BACKGROUND

During glass formation from the melt, contaminants in the melt tend to form gas bubbles, also referred to in the art as "seeds." Such seeds affect the performance and quality of the glass, and efforts are made to remove or "fine" them from the glass.

Seed formation is problematic for silicate glasses. In particular, aluminosilicate glasses and other silicate glasses that melt at high temperature are much more difficult to fine than other glasses. The high viscosities of such glasses slow the rate of bubble removal by via Stokes fining; i.e., allowing the bubbles to rise to the surface of the melt due to buoyancy.

Fining agents such as $As_2O_3$, $Sb_2O_3$, and halides have been used to remove bubbles from aluminosilicate glasses. These chemical fining packages work by releasing gas to existing bubbles, causing them to increase in size and rise more quickly to the top of the melt. However, these components are toxic, hazardous to handle, expensive, and undesirable for environmentally green products and processes. Sulfate fining agents have also been used in soft glasses. However, they contribute to sulfur emissions and actually exacerbate seed formation in aluminosilicate glasses.

SUMMARY

Environmentally friendly fining agents for reducing the concentration of seeds or bubbles in a silicate glass are provided. The fining agent includes at least one inorganic compound, such as a hydrate or a hydroxide, which acts as a source of water. In one embodiment, the fining agent further includes at least one multivalent metal oxide and, optionally, an oxidizer. A fusion formable and ion exchangeable silicate glass having a seed concentration of less than about 1 seed/cm3 is also provided. Methods of reducing the seed concentration of a silicate glass, and a method of making a silicate glass having a seed concentration of less than about 1 seed/cm3 are also described.

Accordingly, one aspect of the disclosure is to provide a silicate glass. The silicate glass has a seed concentration of less than about 1 seed/$cm^3$, wherein a batch or raw materials that form the silicate glass includes at least one fining agent. The fining agent comprises at least one inorganic compound that acts as of a source of water at a temperature where a melt is formed.

Another aspect of the disclosure is to provide a fining agent for silicate glasses. The fining agent comprises an inorganic compound that acts as of a source of water at a temperature where a melt is formed, wherein the water vaporizes and expands existing bubbles in the melt and allows the expanded bubbles to rise to the surface of the melt and escape the melt to reduce the seed concentration in the silicate glass to less than about 1 seed/$cm^3$.

A third aspect of the disclosure is to provide a method of reducing a concentration of seeds in a silicate glass. The method comprises the steps of: providing a batch comprising raw materials for the silicate glass and at least one fining agent, wherein the at least one fining agent comprises at least one inorganic compound that acts as of a source of water at a temperature where a melt is formed; melting the batch to form the melt; vaporizing the water to form water vapor, wherein the water vapor expands existing bubbles in the melt; allowing the expanded bubbles to rise to the surface of the melt and escape the melt to reduce the seed concentration in the melt below a predetermined concentration; and removing at least a portion of the coalesced bubbles and seeds from the melt.

A fourth aspect of the disclosure is to provide a method of making a silicate glass having a seed concentration of less than about 1 seed/$cm^3$. The method comprises the steps of providing a batch comprising raw materials for the silicate glass and at least one fining agent, wherein the at least one fining agent comprises at least one inorganic compound that acts as of a source of water at a temperature of a melt; melting the batch to form the melt; vaporizing the water to form water vapor, wherein the water vapor expands existing bubbles in the melt; allowing the expanded bubbles to rise to the surface of the melt and escape the melt to reduce the seed concentration in the melt below a predetermined concentration; removing at least a portion of the coalesced bubbles and seeds from the melt; and solidifying the melt to form the silicate glass, wherein the silicate glass has a seed concentration of less than about 1 seed/$cm^3$.

These and other aspects, advantages, and salient features will become apparent from the following detailed description, the accompanying drawings, and the appended claims.

DETAILED DESCRIPTION

Figure 1:
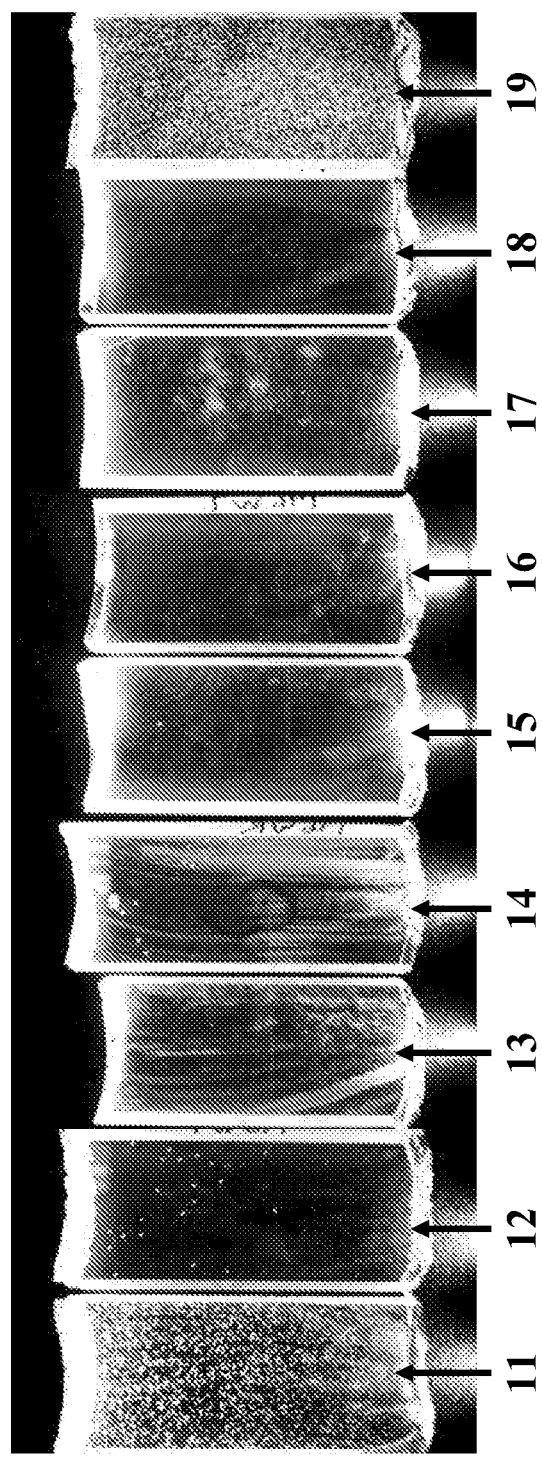
FIG. 1 is a photograph of polished cross sections of glasses obtained from melts containing fining agents.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist of, or consist essentially of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the recited range.

Referring to the drawings in general and to FIG. 1 in particular, it will be understood that the illustrations are for the purpose of describing particular embodiments and are not intended to limit the disclosure and appended claims thereto.

Glasses having relatively high viscosities (i.e., 200 Poise viscosities of between about 1500° C. and 1675° C.) may require melting to obtain a glass having low levels of inclusions. Gaseous inclusions, blisters, or bubbles, which are also referred to herein as "seeds," tend to have an adverse affect of the optical quality and properties of the glass. For example, the presence of seeds affects the refractive index, density, and transmission of light through the glass. To aid in eliminating or reducing the concentration of these gaseous inclusions, it is, in some instances, useful to add chemical fining agents. Such fining agents fill early-stage bubbles with gas, thus increasing the velocity at which the bubbles rise through the melt. Typical fining agents include, but are not limited to: oxides of arsenic, antimony, tin and cerium; metal halides (fluorides, chlorides and bromides); metal sulfates; and the like. Arsenic oxides are particularly effective fining agents because they release oxygen very late in the melt stage. However, arsenic and antimony are generally regarded as hazardous materials. Therefore, it may be advantageous in particular applications to completely avoid using arsenic or antimony, and instead use a nontoxic component to produce a fining effect.

As described herein, the number of seeds within silicate glasses is reduced by providing fining agents that comprise at least one inorganic compound that acts as a source of water at a temperature of a melt formed by the mixture of raw materials (also referred to herein as the "batch" or "batch materials") that are used to form the silicate glass. The inorganic compound may melt or decompose at a temperature below the temperature of the melt, generating water. The water is initially dissolved as a vapor in the melt. As the temperature of the melt increases, the water vapor comes out of solution and is captured by bubbles already present in the melt. The captured water vapor fills the bubbles with steam and expands the bubbles, causing them to rise more quickly to the surface of the melt and escape. For example, aluminum hydroxide ($Al(OH)_3$), which is used as a fining agent, decomposes to form boehmite ($AlO.(OH)$) and water at temperatures below those at which a melt initially appears. The boehmite will decompose at higher temperatures to form alumina ($Al_2O_3$) and water. The water produced by this two-step decomposition will eventually be captured by bubbles already present in the melt, increasing the size of these bubbles and causing them to rise to the surface of the melt, where they escape. The fining agent is also substantially free of arsenic and antimony.

In one embodiment, the water source comprises at least one of a hydrate, a metal hydroxide, and combinations thereof. Hydrates are solid inorganic compounds that contain water molecules, which are either bound to a metal or silicon center or crystallized with a metal complex. Such hydrates are said to contain "water of crystallization" or "water of hydration." With the exception of boric acid, such hydrates may include hydrates of oxides or salts formed by any of the constituents (e.g., alumina, alkali and alkali earth metals, zirconium) of the silicate glass. Metal hydroxides are compounds that comprise a metal and the diatomic hydroxyl $OH^-$ anion.

Non-limiting examples of inorganic or metal hydrates and hydroxides include, but are not limited to: phyllosilicates, such as clays and micas; zeolites; other hydrated silicates; and the like. Clays that may be used as a water source in the fining agent include, but are not limited to: aluminum silicate hydroxides, such as kaolinite and pyrophillite; talc (magnesium silicate hydroxide); montmorillonite-smectite (e.g., Bentonite); and combinations thereof, such as clinochlore (($Mg_5Al)(AlSi_3)O_{10}(OH)_8$). Zeolites are hydrated aluminosilicates having symmetrically stacked alumina and silica tetrahedra that form an open, stable, three-dimensional honeycomb structure having a negative charge. Zeolites that may be used as a water source in the fining agent include, but are not limited to: mineral zeolites, such as analcime, chabazite, heulandite, natrolite, phillipsite, stilbite, and mordenite. Natrolite ($Na_2Al_2Si_3O_{10}.2H_2O$) has a formula that is typical of such mineral zeolites. Synthetic zeolites such as zeolite A, ZSM-5, and the like may also be used in the fining agent.

In one embodiment, the fining agent includes at least one metal hydroxide. Such hydroxides may include the hydroxides formed by any of the constituents (e.g., alumina (($Al(OH)_3$); alkali (e.g., $NaOH$, $KOH$, $LiOH$) and alkali earth ($Mg(OH)_2$, $Ca(OH)_2$, $Sr(OH)_2$, $Ba(OH)_2$) metals; and zirconium ($Zr(OH)_4$)) of the silicate glass. Additionally, the fining agent may comprise the mineral hydroromarchite ($Sn_3O_2(OH)_2$), and/or hydroxides of zinc ($Zn(OH)_2$) and gallium ($Ga(OH)_3$).

In another embodiment, the fining agent further includes at least one multivalent metal oxide that acts as a source of oxygen to the melt and, optionally, an oxidizer. These multivalent metal oxides are reduced in the glass melt, releasing oxygen, which may also form bubbles. Non-limiting examples of such oxides include, but are not limited to, tin(IV) oxide ($SnO_2$), ceria or cerium oxide ($CeO_2$), and the like. The fining agent, in one embodiment, comprises up to 0.5 mol % $SnO_2$, up to 0.5 mol % $CeO_2$, and, optionally, 0-4 mol % of oxidizer.

Oxidizers such as, but not limited to, aluminum nitrate, alkali metal nitrates, alkali earth metal nitrates, zirconium nitrate, ammonium nitrate, and the like re-oxidize the multivalent metal oxides in the melt, thus enhancing the effectiveness of the fining agent. Rather than be consumed by tramp contaminants and organic compounds, the oxygen produced by the reduction of multivalent metal oxides such as tin(IV) oxide and ceria are absorbed by the oxidizer and reused in the fining process.

The fining agents described herein are "batched in" with the rest of the raw materials that are used to formulate the silicate glass. The inorganic compounds that are added as sources of water, such as the hydrates and hydroxides, upon release of water, form oxides that account for a portion of the glass composition.

The source of water decomposes to release water, which is first dissolved in the initial melt and later comes out of solution and vaporizes into the melt as steam (water vapor). The steam is captured by bubbles that are generated by impurities and already exist in the melt. The steam fills these existing bubbles, causing them to expand and increase in size. The larger bubbles rise more quickly to the top surface of the melt and escape the melt. Each mole of aluminum hydroxide, for example, decomposes in the melt to first form boehmite, which then decomposes to form alumina (aluminum oxide), ultimately releasing 1.5 moles of water according to the reactions $Al(OH)_3 \rightarrow AlO.(OH) + H_2O$, and $AlO.(OH) \rightarrow \frac{1}{2}Al_2O_3 + \frac{1}{2}H_2O$.

Expressed in terms of the amount of alumina that is initially introduced, or batched, into the glass as aluminum hydroxide, each mole of $Al_2O_3$ that is batched provides 3 moles of water vapor to the melt. Given that 1 mole of any gas occupies 22.4 liters at standard temperature and pressure (1 kPa (1 bar) pressure, 273 K), or STP, each mole of $Al_2O_3$ batched as $Al(OH)_3$ (molecular weight 156 grams) releases 67 liters of gas. Because the gas is released at the temperature of the melt, the actual volume of gas released by each mole of alumina batched as $Al(OH)_3$ will be much greater than 67 liters. At 1000° C. (1273 K), for example, each mole of alumina batched as $Al(OH)_3$ releases a volume of about 312 liters of gaseous water.

Similarly, a mole of sodium hydroxide decomposes to form sodium oxide and water vapor according to the reaction

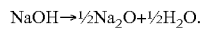

The amount $Na_2O$ batched as sodium hydroxide provides one mole of water vapor to the melt. At STP, one mole of a gas has a volume of 22.4 liters. As previously described above, gaseous water is released at the temperature of the melt, and the actual volume of gas released by each mole of sodium oxide batched as NaOH will be much greater than 22.3 liters.

In one embodiment, at least 1 mole of water per kilogram of glass is used to effectively "fine" the glass—i.e., reduce the number of seeds or bubbles in the glass. In another embodiment, 5-50 moles $H_2O$/kg of glass are used to fine the glass. The amount of water needed to fine the glass depends in part on the density of the glass and other factors, such as the composition of the glass and the viscosity and temperature of the melt. Depending on the parameters for a particular glass, it may be possible in some instances to use less than 1 mole $H_2O$/kg glass to effectively fine the glass.

The fining agents described herein are capable of providing at least 0.25 moles, and, in one embodiment, 0.5 moles of gas (water vapor, oxygen, or the like), per mole of fining agent to the melt. The fining agents are capable of producing a seed concentration within the silicate glass of less than about 1 seed/cm³ or, alternatively, about 5 seeds per pound (454 grams) of silicate glass. In one embodiment, the fining agents described herein are capable of producing a silicate glass that is substantially free of seeds.

The fining agents described herein may also act as "fugitive" fluxes that reduce the viscosity of the melt, causing the bubbles to rise to the top of the melt more rapidly.

A silicate glass having a seed concentration of less than about 1 seed/cm³ or, alternatively, about 5 seeds per pound (454 grams) of silicate glass, is also provided. In one embodiment, the silicate glass is substantially free of seeds. At least one of the fining agents described hereinabove is added to a batch comprising raw materials for the silicate glass. Such raw materials for making the silicate glasses described herein are known in the art. After adding the at least one fining agent to the batch, the batch is melted. The fining agent comprises at least one inorganic compound that acts as a source of water at a temperature of a melt. The silicate glass may be one of a soda lime glass, a borosilicate glass, an aluminosilicate glass, and combinations thereof, such as, for example an aluminoborosilicate glass.

In one embodiment, the silicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$, wherein 12 mol % ≤$Li_2O$+$Na_2O$+$K_2O$ ≤20 mol % and 0 mol %≤MgO+CaO≤10 mol %. In another embodiment, the silicate glass comprises: 63.5-66.5 mol % $SiO_2$; 8-12 mol % $Al_2O_3$; 0-3 mol % $B_2O_3$; 0-5 mol % $Li_2O$; 8-18 mol % $Na_2O$; 0-5 mol % $K_2O$; 1-7 mol % MgO; 0-2.5 mol % CaO; 0-3 mol % $ZrO_2$; 0.05-0.25 mol % $SnO_2$; 0.05-0.5 mol % $CeO_2$, wherein 14 mol %≤$Li_2O$+$Na_2O$+$K_2O$≤18 mol % and 2 mol %≤MgO+CaO≤7 mol %.

The largest single constituent of the silicate glass is $SiO_2$, which forms the matrix of the glass and is present in the inventive glasses in a concentration ranging from about 60 mol % up to and including about 70 mol %. $SiO_2$ serves as a viscosity enhancer that aids formability and imparts chemical durability to the glass. At concentrations that are higher than the range given above, $SiO_2$ prohibitively raises the melting temperature. Glass durability suffers at concentrations below the 60-70 mol % $SiO_2$ range. In addition, lower $SiO_2$ concentrations can cause the liquidus temperature to increase substantially in glasses having high alkali or alkali earth oxide concentrations.

The greater alkali metal oxide content of the silicate glass facilitates melting, softens the glass, enables ion exchange, decreases melt resistivity, and breaks up the glass network, which increases thermal expansion and decreases durability. Mixtures of alkali metal oxides help depress the liquidus temperature and may enhance ion exchange as well. While $Li_2O$ provides fast ion exchange, low density, and high modulus, it is also quite expensive. $Na_2O$ is very desirable for ion exchange with $K^+$ ions for chemical strengthening and makes stable glasses with respect to devitrification. Small amounts of $K_2O$ relative to $Na_2O$ actually help increase the rate exchange of $K^+$ ions for $Na^+$ ions and decrease the liquidus temperature, but also increase the thermal expansivity of the glass.

Alumina ($Al_2O_3$) and, to a lesser extent, zirconia ($ZrO_2$) have the opposite effect of the alkali metal oxides. In addition, $Al_2O_3$ scavenges non-bridging oxygens (NBOs) to form $AlO_4$ tetrahedra while making the glass thermally harder. Alumina and zirconia also provide lower expansion and greater durability but, at high concentrations, make the glass more difficult to melt. In most ion exchangeable glasses, $R_2O$>$Al_2O_3$ (where $R_2O$ represents at least one alkali metal oxide, such as $Li_2O$, $Na_2O$, $K_2O$) since glasses in which $R_2O$=$Al_2O_3$ are very difficult to melt unless $B_2O_3$ is present.

Alkaline earth oxides help create a steeper viscosity curve for the glasses. Replacing alkali metal oxides with alkaline earth metal oxides generally raises the anneal and strain points of the glass while lowering the melting temperatures needed to make high quality glass. MgO and CaO are less expensive than SrO and BaO and do not increase the density as much as the heavier oxides. BaO is also considered to be a hazardous or toxic material, and its presence is therefore undesirable. Accordingly, in one embodiment, the glass is substantially free of barium. Large amounts of MgO tend to increase the liquidus temperature, as the oxide is prone to form forsterite ($Mg_2SiO_4$) at low MgO concentrations in sodium aluminosilicate glasses. Accordingly, in some embodiments, the silicate glass described herein comprises 0-8 mol % MgO.

$B_2O_3$ may be used as a flux to soften glasses, making them easier to melt. $B_2O_3$ also helps scavenge non-bridging oxygen atoms (NBOs), converting the NBOs to bridging oxygen atoms through the formation of $BO_4$ tetrahedra, which increases the toughness of the glass by minimizing the number of weak NBOs. $B_2O_3$ also lowers the hardness of the glass which, when coupled with the higher toughness, decreases the brittleness, thereby resulting in a mechanically durable glass.

Arsenic and antimony are widely regarded as hazardous or toxic materials, and their presence is therefore undesirable. Accordingly, the silicate glass, in another embodiment, is substantially free of at least one of arsenic, antimony, and barium.

In one embodiment, the silicate glass has a liquidus viscosity of at least 100 kilopoise (kpoise). In another embodiment, the liquidus viscosity is at least 160 kpoise, and, in a third embodiment, the liquidus viscosity is at least 220 kpoise. As used herein, the term "liquidus viscosity" refers to the viscosity of a molten glass at the liquidus temperature, wherein the liquidus temperature refers to the temperature at which the very last crystals melt away as temperature is increased from room temperature. These properties permit these silicate glasses to be down-drawable; i.e., the glass is capable of being formed into sheets using down-draw methods such as, but not limited to, fusion draw and slot draw methods that are known to those skilled in the art. Such down-draw processes are used in the large-scale manufacture of ion-exchangeable flat glass.

The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties of the glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet, as only a single sheet is drawn through the slot, rather than two sheets being fused together, as in the fusion down-draw process.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength is higher than that of a surface that has been lapped and polished. Chemical strengthening or tempering by ion exchange also increases the resistance of the glass to flaw formation due to handling. Down-drawn glass may be drawn to a thickness of less than about 2 mm. In addition, down drawn glass has a very flat, smooth surface that can be used in its final application without costly grinding and polishing.

In one embodiment, the silicate glass described herein is substantially free of lithium. As used herein, "substantially free of lithium" means that lithium is not intentionally added to the glass or glass raw materials during any of the processing steps leading to the formation of the alkali aluminosilicate glass. It is understood that a silicate glass or a silicate glass article that is substantially free of lithium may inadvertently contain small amounts of lithium due to contamination. The absence of lithium reduces poisoning of ion exchange baths, and thus reduces the need to replenish the salt supply needed to chemically strengthen the glass. In addition, due to the absence of lithium, the glass is compatible with continuous unit (CU) melting technologies such as the down-draw processes described above and the materials used therein, the latter including both fused zirconia and alumina refractories and zirconia and alumina isopipes.

In one embodiment, the silicate glass comprises at least one alkali metal oxide and is ion exchangeable. As used herein, the term "ion-exchangeable" is understood to mean that the glass is capable of being strengthened by ion exchange processes that are known to those skilled in the art. Such ion exchange processes include, but are not limited to, treating the heated alkali aluminosilicate glass with a heated solution containing ions having a larger ionic radius than ions that are present in the glass surface, thus replacing the smaller ions with the larger ions. Potassium ions, for example, could replace sodium ions in the glass. Alternatively, other alkali metal ions having larger atomic radii, such as rubidium or cesium, could replace smaller alkali metal ions in the glass. Alternatively, the smaller alkali metal ions could be replaced by $Ag^+$ ions. Similarly, other alkali metal salts such as, but not limited to, sulfates, halides, and the like may be used in the ion exchange process. In one embodiment, the down-drawn glass is chemically strengthened by placing it in a molten salt bath comprising $KNO_3$ for a predetermined time period to achieve ion exchange. In one embodiment, the temperature of the molten salt bath is about 430° C. and the predetermined time period is about eight hours.

Surface compressive stress refers to a stress caused by the substitution during chemical strengthening of an alkali metal ion contained in a glass surface layer by another alkali metal ion having a larger ionic radius. In one embodiment, potassium ions are substituted for sodium ions in the surface layer of the glass described herein. The glass has a surface compressive stress of at least about 200 MPa. In one embodiment, the surface compressive stress is at least about 600 MPa. The alkali aluminosilicate glass has a compressive stress layer that has a depth of at least about 30 μm and, in another embodiment, the depth of the compressive stress layer is at least about 40 μm.

The replacement of smaller ions by larger ions at a temperature below that at which the glass network can relax produces a distribution of ions across the surface of the glass that results in a stress profile. The larger volume of the incoming ion produces compressive stress (CS) on the surface and tension in the center (central tension, or CT) of the glass. The compressive stress is related to the central tension by the following relationship:

$$CS=CT\times(t-2DOL)/DOL;$$

where t is the thickness of the glass and DOL is the depth of exchange, also referred to as depth of layer.

The silicate glasses described herein are resistant to both chipping and scratching, making it well suited for use in cover plates, touch screens, watch crystals, solar concentrators, windows, screens, containers, and other applications that require strong and tough glass with good scratch resistance.

A method of reducing the concentration of seeds in a silicate glass is also provided. A batch comprising raw materials for the silicate glass and at least one fining agent, as described herein, is first provided. Such raw materials include, but are not limited to, sand, alumina, nepheline syenite (a mineral comprising $Na_2O.Al_2O_3.2SiO_2$), boric acid, soda ash, potassium carbonate, magnesia, limestone, and the like. The batch containing the at least one fining agent is then melted to form a silicate glass melt. The fining agent comprises at least one inorganic compound that acts as a source of water at the temperature of the melt. In one embodiment, the fining agent comprises at least one of a metal hydrate, a metal hydroxide, and combinations thereof. In another embodiment, the fining agent may further include at least one multivalent metal oxide that acts as a source of oxygen to the melt and, optionally, at least one oxidizer, all of which have been previously described herein.

As previously described herein, the inorganic compound that acts as source of water at the temperature of the melt may decompose below the temperature of the melt, generating water vapor that is initially dissolved in the solid or melt. As temperature increases the water vapor (steam) comes out of solution. The water vapor is captured by bubbles that already exist in the melt. The water vapor fills these existing bubbles, causing them to expand and increase in size. The expanded bubbles rise more quickly to the top surface of the melt and escape the melt. At least a portion of the expanded bubbles are then removed from the melt, usually by allowing them to rise to the surface of the melt, where the gases in the bubbles escape into the atmosphere above the melt and the seed concentration in the resulting silicate glass is reduced to a concentration below a predetermined level. In one embodiment, the bubbles are allowed to rise and the gases allowed to escape by maintaining the temperature of the melt at or above a predetermined temperature. For example, some aluminosilicate glasses are first melted at about 1525° C. and then heated to about 1600° C. to allow gases to escape from the melt.

A method of making the silicate glasses described herein is also provided. A batch comprising raw materials for a silicate glass and at least one fining agent, as described herein, is first provided. Such raw materials include, but are not limited to, sand, alumina, nepheline syenite (a mineral comprising $Na_2O.Al_2O_3.2SiO_2$), boric acid, soda ash, potassium carbonate, magnesia, limestone, and the like. The batch containing the at least one fining agent is then heated to a temperature at which a melt begins to form. The fining agent comprises at least one inorganic compound that acts as a source of water at the temperature of the melt. In one embodiment, the fining agent comprises at least one of a metal hydrate and a metal hydroxide. In another embodiment, the fining agent may further include at least one multivalent metal oxide that acts as a source of oxygen to the melt and, optionally, at least one oxidizer, all of which have been previously described herein.

As previously described herein, the inorganic compound that acts as source of water at the temperature of the melt may decompose below the temperature of the melt, generating water vapor that is initially dissolved in the solid or melt. As temperature increases, the water vapor (steam) comes out of solution. The water vapor is captured by bubbles that already exist in the melt. The water vapor fills these existing bubbles, causing them to expand and increase in size. The expanded bubbles rise more quickly to the top surface of the melt and escape the melt. At least a portion of the expanded bubbles are then removed from the melt, usually by allowing them to rise to the surface of the melt where the gases in the bubbles escape into the atmosphere above the melt, thus reducing the concentration of bubbles or seeds in the melt to a concentration below a predetermined level. In one embodiment, the bubbles are allowed to rise and the vapors allowed to escape by maintaining the temperature of the melt above a predetermined temperature. The silicate glass, having a seed concentration of less than about 1 seed/cm$^3$, is then solidified.

EXAMPLES

The following examples illustrate the features and advantages of the invention and in no way are intended to limit the disclosure and appended claims thereto.

Example 1

Example 1 serves to illustrate the effectiveness of the fining agents described herein. Nine samples of aluminosilicate crucible melts were prepared. The batch materials used for each sample are listed in Table 1a. Different combinations of the fining agents of the present invention were added to samples 11-18. Sample 19 did not contain any of the fining agents described hereinabove, and thus served as a control sample. In samples 12, 13, 14, and 18, the fining agent aluminum hydroxide ($Al(OH)_3$) was substituted for alumina ($Al_2O_3$) in the batch. Sodium hydroxide (NaOH) was substituted for soda ash in samples 15 and 16. Ceria and tin(IV) oxide were added to samples 11-18, and the oxidizer sodium nitrate ($NaNO_3$) was added to samples 17 and 18.

The batched samples were melted at 1525° C. for one hour and then heated at 1600° C. for one hour to facilitate the removal of bubbles from the melt. The compositions of the resulting glasses, expressed in weight percent and mole percent, are listed in Tables 1b and 1c, respectively. Tables 1b and 1c also include the averages concentration of seeds or bubbles in the glass samples, expressed as seeds/cm$^3$.

As previously described herein, upon the release of water, the inorganic compound fining agents, such as the hydrates and hydroxides that are added as sources of water, form oxides that account for a portion of the glass composition. This is shown in tables 1c, 2c, and 3c.

Polished cross-sections of glasses obtained from the melts in Example 1 are shown in FIG. 1. Sample 19, which contained none of the fining agents, has an average seed concentration of 930 seeds/cm$^3$. The addition of 0.1 mol % $SnO_2$ and 0.1 mol % $CeO_2$ alone (sample 11) drastically reduces the concentration of seeds or bubbles in the glass to 79.1 seeds/cm$^3$. The use of the oxidizer ($NaNO_3$) with $SnO_2$ and $CeO_2$ alone (sample 17) also further reduces the concentration of bubbles or seeds to 0.061 seeds/cm$^3$.

The addition of either $Al(OH)_3$ (samples 12, 13, 14, 18), or NaOH (samples 15 and 16) adds water in the form of hydroxides. Either of these fining agents reduces the seed concentration to levels below those observed when a combination of tin(IV) oxide and ceria alone (sample 11) is used, whereas addition of even higher levels of these hydroxides virtually eliminate seeds or bubbles under the melting conditions used. The addition of $Al(OH)_3$ reduces the seed concentration to values ranging from 0.610 seeds/cm$^3$ (sample 14, in which 359 g of nephelene syenite were added to the batch) to 0.183 seeds/cm$^3$ (sample 18, in which 247 g $(Al(OH)_3$ were added to the batch). The addition of NaOH reduces seed concentration to values ranging from 0.580 seeds/cm$^3$ (sample 15, 87 g NaOH added to the batch) to 0.677 seeds/cm$^3$ (sample 16, 173 g NaOH added to the batch). Use of the oxidizer $NaNO_3$ with $SnO_2$, $CeO_2$, and a hydrate (sample 18) reduces the number of bubbles/seeds in the glass to a concentration of 0.183 seeds/cm$^3$.

Example 2

Example 2 illustrates the amount of fining agent (or agents) that effectively reduce the concentration of bubbles/ seeds in silicate glasses. Nine samples of aluminosilicate crucible melts were prepared. The batch materials used for each sample are listed in Table 2a. Ceria and tin(IV) oxide were added to samples 21-29, and are the only fining agents present in sample 29. The fining agent aluminum hydroxide (Al(OH)$_3$) was substituted for alumina (Al$_2$O$_3$) in the batch in samples 21 and 22, and sodium hydroxide (NaOH) was substituted for soda ash in samples 23 and 24. Samples 21 and 23 each contain an amount of hydroxide fining agent (Al(OH)$_3$ in sample 21 and NaOH in sample 23) to generate three moles of H$_2$O, whereas samples 22 and 24 each contain an amount of hydroxide fining agent ((Al(OH)$_3$) in sample 21 and NaOH in sample 23) to generate six moles of H$_2$O. Sodium nitrate was added as an oxidizer to samples 27 and 28.

Varying amounts of tall oil, an organic fatty acid, were added to samples 25 and 26. Tall oil burns at melt temperatures, consuming O$_2$ to yield CO, CO$_2$, and water as combustion products.

The batched samples were melted at 1525° C. for one hour and then heated at 1600° C. for one hour to facilitate the removal of bubbles from the melt. The compositions of the resulting glasses, expressed in weight percent and mole percent, are listed in Tables 2b and 2c, respectively.

Figure 2:
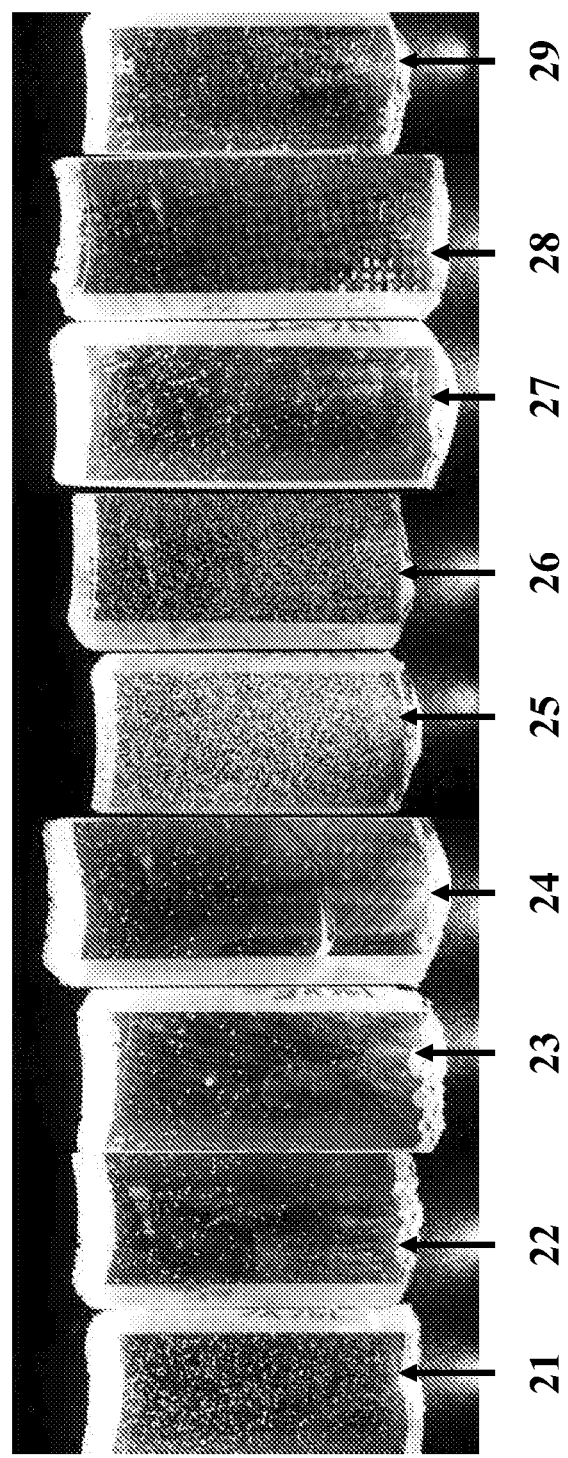
FIG. 2 is a photograph of polished cross sections of glasses obtained from melts showing the effect of different fining agents on the concentration of seeds within the melt.

Polished cross-sections of glasses obtained from the melts in Example 2 are shown in FIG. 2. Both aluminum hydroxide and sodium hydroxide fining agents effectively fine the glass. For a given amount of water generated by the fining agents (i.e., comparing sample 21 vs. sample 23 and sample 22 vs. sample 24), NaOH appears to be more effective than Al(OH)$_3$ in reducing the bubble/seed count in the glass.

Based on these experiments, tall oil does not act as a fining agent. Instead, as seen in samples 25 and 26 in FIG. 2, the addition of tall oil to the melt leads to an increase bubble/seed formation in the glass.

Example 3

Example 3 compares the effectiveness of the hydroxide fining agents to hydrogen permeation. The batch materials used for each sample are listed in Table 3a.

Samples 31 and 32 were identical samples, each containing aluminum hydroxide, tin(IV) oxide, and ceria. Samples 31 and 32 were placed in platinum crucibles. Sample 32 was melted with glass on both sides of the crucible to effectively shut off hydrogen permeation into the sample. Sample 32 was further contained by a second refractory crucible backer.

Samples 33 and 34 were identical samples, containing tin(IV) oxide, ceria, and 52.78 g of sodium nitrate oxidizer. Sample 33 was melted with glass on both sides of the crucible to effectively shut off hydrogen permeation into the sample. Samples 35, 36, and 37 contained SnO$_2$, CeO$_2$, and 26.39, 105.55 g, and 52.78 g, respectively, of NaNO$_3$. Sample 38 contained SnO$_2$ and NaNO$_3$, but no ceria, whereas sample 9 contained ceria and NaNO$_3$, but no tin(IV) oxide.

The batched samples were melted at 1525° C. for one hour and then heated at 1600° C. for one hour to facilitate the removal of bubbles from the melt. The compositions of the resulting glasses, expressed in weight percent and mole percent, are listed in Tables 3b and 3c, respectively.

Figure 3:
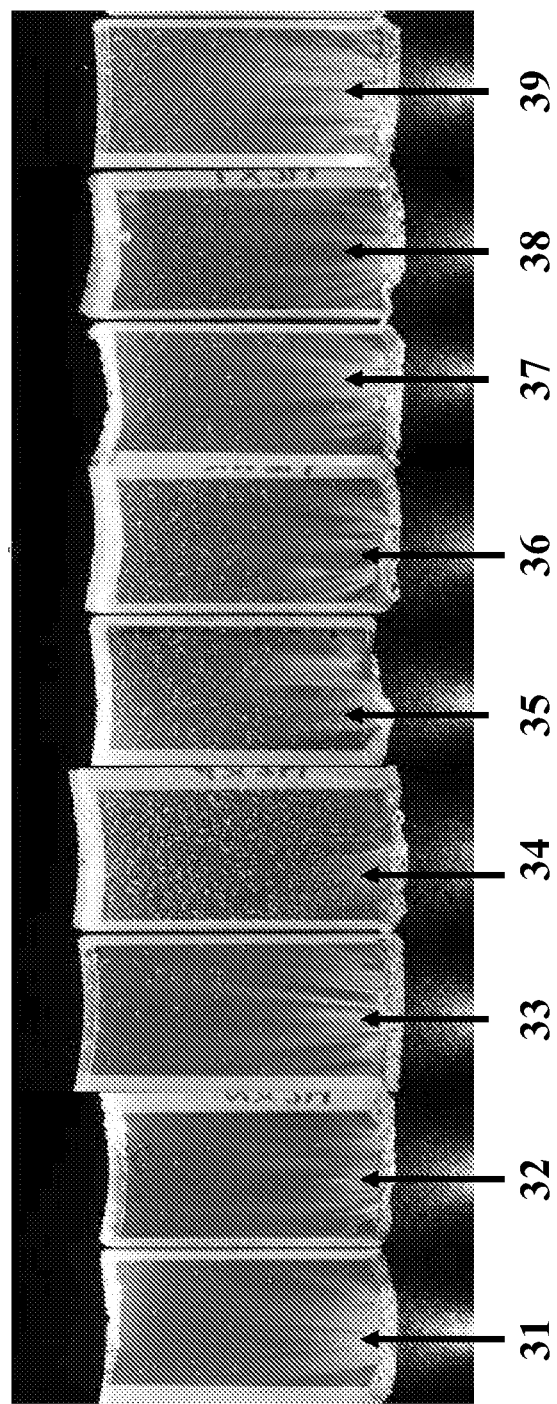
FIG. 3 is a photograph of polished cross sections of glasses obtained from melts comparing the effectiveness of hydroxide fining agents in reducing seed formation.

Polished cross-sections of glasses obtained from the melts in Example 3 are shown in FIG. 3. Comparison of samples 31 and 32 shows no apparent difference in the number of bubbles/seeds, indicating the hydrogen permeation is not the mechanism for fining/bubble reduction in the melt.

Samples 33 and 34 do not contain hydride fining agents. In this case, the glass where H$_2$ permeation was shut off (sample 33) has fewer bubbles, again showing that H$_2$ permeation is not the effective mechanism of the fining package of the present invention.

Samples 35-37 demonstrate that varying the amount of oxidizer has little effect on the number of bubbles/seeds in the melt. These samples all exhibit low concentrations of bubbles/seeds, compared to glasses that do not contain the fining agents described herein (see, for example, sample 39 in FIG. 1). Similarly, melts containing oxidizer and either tin(IV) oxide alone (sample 38) or ceria alone (sample 39) yield low concentrations of bubbles/seeds, showing that the presence of just one of these fining agents and an oxidizer is still effective in removing bubbles/seeds.

Example 4

Example 4 identified fining agent or agents that effectively reduces the concentration of bubbles/seeds in soda lime glasses. Nine samples of soda lime crucible melts were prepared. The batch materials used for each sample are listed in Table 4a.

The batched samples were melted at 1425° C. for one hour and then heated at 1525° C. for one hour to facilitate the removal of bubbles from the melt. The compositions of the resulting glasses, expressed in weight percent and mole percent, are listed in Tables 4b and 4c, respectively.

Sample 41, which contained no fining agent or oxidizer, had numerous seeds. A substantial reduction in seed concentration was observed in sample 48, in which talc and tin(IV) oxide were added to the batch. Lesser reductions in seed concentration was observed in samples 42 (containing only one fining agent: tin(IV) oxide); 43 (containing tin(IV) oxide and sodium nitrate oxidizer); 44 (containing only one fining agent: NaOH); 45 (containing tin(IV) oxide and NaOH); 46 (containing tin(IV) oxide, NaOH and sodium nitrate); 47 (containing tin(IV) oxide and calcium hydroxide); and 49 (containing tin(IV) oxide and sodium sulfate oxidizer).

Example 5

Example 5 identified fining agent or agents that effectively reduces the concentration of bubbles/seeds in aluminosilicate glasses that are used in liquid crystal display (LCD) applications. Nine samples of aluminosilicate crucible melts were prepared. The batch materials used for each sample are listed in Table 5a.

The batched samples were melted at 1550° C. for one hour and then heated at 1625° C. for one hour to facilitate the removal of bubbles from the melt. The compositions of the resulting glasses, expressed in weight percent and mole percent, are listed in Tables 5b and 5c, respectively.

Very few seeds were observed in sample 54, in which fining agents aluminum hydroxide and tin(IV) oxide, and barium nitrate oxidizer were added to the batch. A substantial reduction in seed concentration was observed for samples 52 (containing tin(IV) oxide and half the amount of aluminum hydroxide in sample 54); 53 (containing tin(IV) oxide and the same amount of aluminum hydroxide as in sample 54); and 57 (containing sodium hydroxide, the same amount of aluminum hydroxide as in sample 54, and barium nitrate oxidizer). The reduction in seed concentration observed in samples 51 and 58 (both containing tin(IV) oxide and barium nitrate oxidizer) was less than that observed in samples 54, 52, 53, and 57, but still significant.

No reduction in seed concentration was observed in samples 55 (containing twice the tin(IV) oxide concentration of samples 51-54 and 57-59, and barium nitrate) and 56 ((containing three times the tin(IV) oxide concentration of samples 51-54 and 57-59, and barium nitrate oxidizer).

Example 6

Example 6 identified fining agent or agents that effectively reduces the concentration of bubbles/seeds in aluminosilicate glasses having high boron concentrations. First and second sets of samples of crucible melts were prepared. The batch materials used for each of the first and second set of samples are listed in Table 5a1, respectively.

The first set of batched samples was melted at 1525° C. for one hour and then heated at 1625° C. for one hour to facilitate the removal of bubbles from the melt. The compositions of the resulting glasses, expressed in weight percent and mole percent, are listed in Tables 5b1 and 5c1, respectively. The second set of batched samples was melted at 1529° C. for one hour and then heated at 1625° C. for one hour to facilitate the removal of bubbles from the melt. The compositions of the resulting glasses, expressed in weight percent and mole percent, are listed in Tables 5b2 and 5c2, respectively.

Samples 63 and 64 were substantially free of seeds. The batch material for sample 3 included fining agents tin(IV) oxide and hydrated alumina, whereas the batch material for sample 64 comprised fining agents arsenic pentoxide, tin (IV) oxide, and sodium nitrate as an oxidizer. The results obtained for samples 63 and 64 show that the addition of water (in the form of hydrated alumina) and tin(IV) oxide works as effectively as arsenic. A substantial reduction in seed concentration was also observed for samples 61 and 62, in which the batch materials included water (in the form of hydrated alumina) as the sole fining agent. The results obtained for samples 61 and 62 indicate that water-containing hydrates can effectively act as fining agents for glasses over a range of boron contents.

Substantial reduction in seed count were also observed for samples 65 and 66. Fining agents added to the batch materials for sample 65 included hydrated alumina, cerium oxide, and tin(IV) oxide. Fining agents added to the batch materials for sample 66 included hydrated alumina, sodium hydroxide, cerium oxide, and tin(IV) oxide. The results obtained for these samples also demonstrate the efficacy of water in the form of hydrated alumina as a fining agent for boron-containing glasses.

While typical embodiments have been set forth for the purpose of illustration, the foregoing description should not be deemed to be a limitation on the scope of the above disclosure and appended claims. Accordingly, various modifications, adaptations, and alternatives may occur to one skilled in the art without departing from the spirit and scope of the present disclosure.

TABLE 1a

Compositions of batch materials, expressed in grams, for crucible melts described in Example 1.

| Batch Material | 11 | 12 | 13 | 14 | 15 | 16 | 17 | 18 | 19 |
|---|---|---|---|---|---|---|---|---|---|
| Sand | 616.56 | 616.57 | 616.59 | 396.99 | 616.57 | 616.58 | 616.56 | 616.59 | 619.67 |
| Alumina | 161.71 | 82.33 | 0 | 0 | 161.71 | 161.71 | 161.71 | 0 | 162.51 |
| Aluminum hydroxide | 0.00 | 121.40 | 247.30 | 120.15 | 0.00 | 0.00 | 0.00 | 247.30 | 0.00 |
| Nepheline Syenite | 0.00 | 0.00 | 0.00 | 359.48 | 0.00 | 0.00 | 0.00 | 0.00 | 0.00 |
| Boric Acid | 12.06 | 12.06 | 12.06 | 12.06 | 12.06 | 12.06 | 12.06 | 12.06 | 12.06 |
| Soda Ash | 227.86 | 227.84 | 227.81 | 165.45 | 112.69 | 0 | 194.96 | 194.90 | 228.89 |
| Sodium Hydroxide | 0.00 | 0.00 | 0.00 | 0.00 | 87.27 | 172.67 | 0.00 | 0.00 | 0.00 |
| Sodium Nitrate | 0.00 | 0.00 | 0.00 | 0.00 | 0.00 | 0.00 | 52.78 | 52.78 | 0.00 |
| Potassium Carbonate | 52.69 | 52.69 | 52.69 | 27.29 | 52.69 | 52.69 | 52.66 | 52.66 | 52.98 |
| Magnesia | 37.86 | 37.86 | 37.86 | 37.92 | 37.87 | 37.87 | 37.86 | 37.86 | 38.07 |
| Limestone | 8.23 | 8.23 | 8.23 | 6.30 | 8.50 | 8.77 | 8.31 | 8.31 | 8.23 |
| Tin (IV) Oxide | 2.31 | 2.31 | 2.31 | 2.31 | 2.31 | 2.31 | 2.31 | 2.31 | 0.00 |
| Cerium (IV) Oxide | 2.72 | 2.72 | 2.72 | 2.72 | 2.72 | 2.72 | 2.72 | 2.72 | 0.00 |

TABLE 1b

Compositions of glasses prepared from crucible melts described in Example 1, expressed in weight percent.

| Composition (mol %) | 11 | 12 | 13 | 14 | 15 | 16 | 17 | 18 | 19 |
|---|---|---|---|---|---|---|---|---|---|
| $SiO_2$ | 61.37 | 61.37 | 61.38 | 61.38 | 61.37 | 61.37 | 61.37 | 61.37 | 61.69 |
| $Al_2O_3$ | 16.23 | 16.24 | 16.24 | 16.24 | 16.23 | 16.23 | 16.23 | 16.23 | 16.32 |
| $B_2O_3$ | 0.68 | 0.68 | 0.68 | 0.68 | 0.68 | 0.68 | 0.68 | 0.68 | 0.68 |
| $Na_2O$ | 13.33 | 13.33 | 13.33 | 13.33 | 13.33 | 13.33 | 13.33 | 13.33 | 13.39 |
| $K_2O$ | 3.57 | 3.57 | 3.57 | 3.57 | 3.57 | 3.57 | 3.57 | 3.57 | 3.59 |
| MgO | 3.66 | 3.66 | 3.66 | 3.66 | 3.66 | 3.66 | 3.66 | 3.66 | 3.68 |
| CaO | 0.50 | 0.50 | 0.50 | 0.50 | 0.50 | 0.50 | 0.50 | 0.50 | 0.50 |
| $SnO_2$ | 0.23 | 0.23 | 0.23 | 0.23 | 0.23 | 0.23 | 0.23 | 0.23 | 0.00 |
| $CeO_2$ | 0.27 | 0.27 | 0.27 | 0.27 | 0.27 | 0.27 | 0.27 | 0.27 | 0.00 |
| $Fe_2O_3$ | 0.02 | 0.02 | 0.01 | 0.01 | 0.02 | 0.02 | 0.02 | 0.01 | 0.02 |
| Average seeds/$cm^3$ | 79.11 | 0.482 | 0.384 | 0.610 | 0.580 | 0.677 | 0.061 | 0.183 | 929.7 |

TABLE 1c

Compositions of glasses prepared from crucible melts described in Example 1, expressed in mole percent.

| Composition (mol %) | 11 | 12 | 13 | 14 | 15 | 16 | 17 | 18 | 19 |
|---|---|---|---|---|---|---|---|---|---|
| SiO$_2$ | 65.89 | 65.89 | 65.89 | 65.89 | 65.89 | 65.89 | 65.89 | 65.89 | 65.89 |
| Al$_2$O$_3$ (Alumina) | 10.27 | 5.27 | 0 | 0 | 10.27 | 10.27 | 10.27 | 0 | 10.27 |
| Al$_2$O$_3$ (Al(OH)$_3$) | 0 | 5 | 10.27 | 5 | 0 | 0 | 0 | 10.27 | 0 |
| Al$_2$O$_3$ (Nepheline) | 0 | 0 | 0 | 5.27 | 0 | 0 | 0 | 0 | 0 |
| B$_2$O$_3$ | 0.63 | 0.63 | 0.63 | 0.63 | 0.63 | 0.63 | 0.63 | 0.63 | 0.63 |
| Na$_2$O (Soda Ash) | 13.91 | 13.91 | 13.91 | 13.91 | 6.91 | 0 | 11.91 | 11.91 | 13.91 |
| Na$_2$O (NaOH) | 0 | 0 | 0 | 0 | 7 | 13.91 | 0 | 0 | 0 |
| Na$_2$O (NaNO$_3$) | 0 | 0 | 0 | 0 | 0 | 0 | 2 | 2 | 0 |
| K$_2$O | 2.45 | 2.45 | 2.45 | 2.45 | 2.45 | 2.45 | 2.45 | 2.45 | 2.45 |
| MgO | 5.86 | 5.86 | 5.86 | 5.86 | 5.86 | 5.86 | 5.86 | 5.86 | 5.86 |
| CaO | 0.57 | 0.57 | 0.57 | 0.57 | 0.57 | 0.57 | 0.57 | 0.57 | 0.57 |
| SnO$_2$ | 0.10 | 0.10 | 0.10 | 0.10 | 0.10 | 0.10 | 0.10 | 0.10 | 0 |
| CeO$_2$ | 0.10 | 0.10 | 0.10 | 0.10 | 0.10 | 0.10 | 0.10 | 0.10 | 0 |
| Average seeds/cm$^3$ | 79.11 | 0.482 | 0.384 | 0.610 | 0.580 | 0.677 | 0.061 | 0.183 | 929.7 |

TABLE 2a

Compositions of batch materials, expressed in grams, for crucible melts described in Example 2.

| Batch Material | 21 | 22 | 23 | 24 | 25 | 26 | 27 | 28 | 29 |
|---|---|---|---|---|---|---|---|---|---|
| Sand | 616.56 | 616.56 | 616.56 | 616.56 | 616.56 | 616.56 | 616.56 | 189.49 | 616.56 |
| Alumina | 145.77 | 129.94 | 161.71 | 161.71 | 161.71 | 161.71 | 161.71 | 0 | 161.71 |
| Aluminum hydroxide | 24.22 | 48.59 | 0.00 | 0.00 | 0.00 | 0.00 | 0.00 | 0.00 | 0.00 |
| Nepheline Syenite | 0.00 | 0.00 | 0.00 | 0.00 | 0.00 | 0.00 | 0.00 | 699.16 | 0.00 |
| Boric Acid | 12.06 | 12.06 | 12.06 | 12.06 | 12.06 | 12.06 | 12.06 | 12.06 | 12.06 |
| Soda Ash | 227.86 | 227.85 | 178.50 | 129.15 | 227.86 | 227.86 | 194.96 | 73.63 | 227.86 |
| Sodium Hydroxide | 0.00 | 0.00 | 37.40 | 74.81 | 0.00 | 0.00 | 0.00 | 0.00 | 0.00 |
| Sodium Nitrate | 0.00 | 0.00 | 0.00 | 0.00 | 0.00 | 0.00 | 52.78 | 52.78 | 0.00 |
| Potassium Carbonate | 52.69 | 52.69 | 52.69 | 52.69 | 52.69 | 52.69 | 52.66 | 3.27 | 52.69 |
| Magnesia | 37.86 | 37.86 | 37.86 | 37.87 | 37.86 | 37.86 | 37.86 | 37.97 | 37.86 |
| Limestone | 8.23 | 8.23 | 8.35 | 8.46 | 8.23 | 8.23 | 8.31 | 4.56 | 8.23 |
| Tin (IV) Oxide | 2.31 | 2.31 | 2.31 | 2.31 | 2.31 | 2.31 | 2.31 | 2.31 | 2.31 |
| Cerium (IV) Oxide | 2.72 | 2.72 | 2.72 | 2.72 | 2.72 | 2.72 | 2.72 | 2.72 | 2.72 |
| Fatty Acid, Tall Oil | | | | | 1.00 | 5.00 | | | |

TABLE 2b

Compositions of glasses prepared from crucible melts described in Example 2, expressed in weight percent.

| Composition (wt %) | 21 | 22 | 23 | 24 | 25 | 26 | 27 | 28 | 29 |
|---|---|---|---|---|---|---|---|---|---|
| SiO$_2$ | 61.38 | 61.37 | 61.37 | 61.37 | 61.37 | 61.37 | 61.37 | 61.38 | 61.37 |
| Al$_2$O$_3$ | 16.23 | 16.23 | 16.23 | 16.23 | 16.23 | 16.23 | 16.23 | 16.24 | 16.23 |
| B$_2$O$_3$ | 0.68 | 0.68 | 0.68 | 0.68 | 0.68 | 0.68 | 0.68 | 0.68 | 0.68 |
| Na$_2$O | 13.33 | 13.33 | 13.33 | 13.33 | 13.33 | 13.33 | 13.33 | 13.33 | 13.33 |
| K$_2$O | 3.58 | 3.57 | 3.57 | 3.57 | 3.57 | 3.57 | 3.57 | 3.57 | 3.57 |
| MgO | 3.66 | 3.66 | 3.66 | 3.66 | 3.66 | 3.66 | 3.66 | 3.66 | 3.66 |
| CaO | 0.50 | 0.50 | 0.50 | 0.50 | 0.50 | 0.50 | 0.50 | 0.50 | 0.50 |
| SnO$_2$ | 0.23 | 0.23 | 0.23 | 0.23 | 0.23 | 0.23 | 0.23 | 0.23 | 0.23 |
| CeO$_2$ | 0.27 | 0.27 | 0.27 | 0.27 | 0.27 | 0.27 | 0.27 | 0.27 | 0.27 |
| Fe$_2$O$_3$ | 0.02 | 0.02 | 0.02 | 0.02 | 0.02 | 0.02 | 0.02 | 0.00 | 0.02 |

TABLE 2c

Compositions of glasses prepared from crucible melts described in Example 2, expressed in mole percent.

| Composition (mol %) | 21 | 22 | 23 | 24 | 25 | 26 | 27 | 28 | 29 |
|---|---|---|---|---|---|---|---|---|---|
| SiO$_2$ | 65.89 | 65.89 | 65.89 | 65.89 | 65.89 | 65.89 | 65.89 | 65.89 | 65.89 |
| Al$_2$O$_3$ (Alumina) | 9.27 | 8.27 | 10.27 | 10.27 | 10.27 | 10.27 | 10.27 | 0 | 10.27 |
| Al$_2$O$_3$ (Al(OH)$_3$) | 1 | 2 | 0 | 0 | 0 | 0 | 0 | 0 | 0 |
| Al$_2$O$_3$ (Nepheline) | 0 | 0 | 0 | 0 | 0 | 0 | 0 | 10.27 | 0 |

TABLE 2c-continued

Compositions of glasses prepared from crucible melts described in Example 2, expressed in mole percent.

| Composition (mol %) | 21 | 22 | 23 | 24 | 25 | 26 | 27 | 28 | 29 |
|---|---|---|---|---|---|---|---|---|---|
| B₂O₃ | 0.63 | 0.63 | 0.63 | 0.63 | 0.63 | 0.63 | 0.63 | 0.63 | 0.63 |
| Na₂O (Soda Ash) | 13.91 | 13.91 | 10.91 | 7.91 | 13.91 | 13.91 | 11.91 | 11.91 | 13.91 |
| Na₂O (NaOH) | 0 | 0 | 3 | 6 | 0 | 0 | 0 | 0 | 0 |
| Na₂O (NaNO₃) | 0 | 0 | 0 | 0 | 0 | 0 | 2 | 2 | 0 |
| K₂O | 2.45 | 2.45 | 2.45 | 2.45 | 2.45 | 2.45 | 2.45 | 2.45 | 2.45 |
| MgO | 5.86 | 5.86 | 5.86 | 5.86 | 5.86 | 5.86 | 5.86 | 5.86 | 5.86 |
| CaO | 0.57 | 0.57 | 0.57 | 0.57 | 0.57 | 0.57 | 0.57 | 0.57 | 0.57 |
| SnO₂ | 0.10 | 0.10 | 0.10 | 0.10 | 0.10 | 0.10 | 0.10 | 0.10 | 0.10 |
| CeO₂ | 0.10 | 0.10 | 0.10 | 0.10 | 0.10 | 0.10 | 0.10 | 0.10 | 0.10 |

TABLE 3a

Compositions of batch materials, expressed in grams, for crucible melts described in Example 3.

| Batch Material | 31 | 32 | 33 | 34 | 35 | 36 | 37 | 38 | 39 |
|---|---|---|---|---|---|---|---|---|---|
| Sand | 616.59 | 616.59 | 616.56 | 616.56 | 616.56 | 616.56 | 188.45 | 616.76 | 616.36 |
| Alumina | 0 | 0 | 161.71 | 161.71 | 161.71 | 161.71 | 0 | 161.71 | 161.61 |
| Aluminum hydroxide | 247.30 | 247.30 | 0.00 | 0.00 | 0.00 | 0.00 | 0.00 | 0.00 | 0.00 |
| Nepheline Syenite | 0.00 | 0.00 | 0.00 | 0.00 | 0.00 | 0.00 | 699.16 | 0.00 | 0.00 |
| Boric Acid | 12.06 | 12.06 | 12.06 | 12.06 | 12.06 | 12.06 | 12.06 | 12.06 | 12.06 |
| Soda Ash | 227.81 | 227.81 | 194.96 | 194.96 | 211.41 | 162.05 | 73.33 | 194.97 | 194.78 |
| Sodium Nitrate | 0.00 | 0.00 | 52.78 | 52.78 | 26.39 | 105.55 | 52.78 | 52.78 | 52.78 |
| Potassium Carbonate | 52.69 | 52.69 | 52.66 | 52.66 | 52.67 | 52.64 | 3.15 | 52.66 | 52.66 |
| Magnesia | 37.86 | 37.86 | 37.86 | 37.86 | 37.86 | 37.86 | 37.97 | 37.86 | 37.86 |
| Limestone | 8.23 | 8.23 | 8.31 | 8.31 | 8.27 | 8.38 | 4.55 | 8.31 | 8.31 |
| Tin (IV) Oxide | 2.31 | 2.31 | 2.31 | 2.31 | 2.31 | 2.31 | 2.31 | 4.71 | 0.00 |
| Cerium Oxide | 2.72 | 2.72 | 2.72 | 2.72 | 2.72 | 2.72 | 2.72 | 0.00 | 5.35 |

TABLE 3b

Compositions of glasses prepared from crucible melts described in Example 3, expressed in weight percent.

| Composition (wt %) | 31 | 32 | 33 | 34 | 35 | 36 | 37 | 38 | 39 |
|---|---|---|---|---|---|---|---|---|---|
| SiO₂ | 61.38 | 61.38 | 61.37 | 61.37 | 61.37 | 61.37 | 61.38 | 61.40 | 61.36 |
| Al₂O₃ | 16.24 | 16.24 | 16.23 | 16.23 | 16.23 | 16.23 | 16.24 | 16.24 | 16.23 |
| B₂O₃ | 0.68 | 0.68 | 0.68 | 0.68 | 0.68 | 0.68 | 0.68 | 0.68 | 0.68 |
| Na₂O | 13.33 | 13.33 | 13.33 | 13.33 | 1333 | 13.33 | 13.33 | 13.33 | 13.32 |
| K₂O | 3.57 | 3.57 | 3.57 | 3.57 | 3.57 | 3.57 | 3.57 | 3.57 | 3.57 |
| MgO | 3.66 | 3.66 | 3.66 | 3.66 | 3.66 | 3.66 | 3.66 | 3.66 | 3.66 |
| CaO | 0.50 | 0.50 | 0.50 | 0.50 | 0.50 | 0.50 | 0.50 | 0.50 | 0.50 |
| SnO₂ | 0.23 | 0.23 | 0.23 | 0.23 | 0.23 | 0.23 | 0.23 | 0.47 | 0.00 |
| CeO₂ | 0.27 | 0.27 | 0.27 | 0.27 | 0.27 | 0.27 | 0.27 | 0.00 | 0.53 |
| Fe₂O₃ | 0.01 | 0.01 | 0.02 | 0.02 | 0.02 | 0.02 | 0.00 | 0.02 | 0.02 |

TABLE 3c

Compositions of glasses prepared from crucible melts described in Example 3, expressed in mole percent.

| Composition (mol %) | 31 | 32 | 33 | 34 | 35 | 36 | 37 | 38 | 39 |
|---|---|---|---|---|---|---|---|---|---|
| SiO₂ | 65.89 | 65.89 | 65.89 | 65.89 | 65.89 | 65.89 | 65.89 | 65.89 | 65.89 |
| Al₂O₃ (Alumina) | 0 | 0 | 10.27 | 10.27 | 10.27 | 10.27 | 0 | 10.27 | 10.27 |
| Al₂O₃ (Al(OH)₃) | 10.27 | 10.27 | 0 | 0 | 0 | 0 | 0 | 0 | 0 |
| Al₂O₃ (Nepheline) | 0 | 0 | 0 | 0 | 0 | 0 | 10.27 | 0 | 0 |
| B₂O₃ | 0.63 | 0.63 | 0.63 | 0.63 | 0.63 | 0.63 | 0.63 | 0.63 | 0.63 |

TABLE 3c-continued

Compositions of glasses prepared from crucible melts described in Example 3, expressed in mole percent.

| Composition (mol %) | 31 | 32 | 33 | 34 | 35 | 36 | 37 | 38 | 39 |
|---|---|---|---|---|---|---|---|---|---|
| Na₂O (Soda Ash) | 13.91 | 13.91 | 11.91 | 11.91 | 12.91 | 9.91 | 11.91 | 11.91 | 11.91 |
| Na₂O (NaNO₃) | 0 | 0 | 2 | 2 | 1 | 4 | 2 | 2 | 2 |
| K₂O | 2.45 | 2.45 | 2.45 | 2.45 | 2.45 | 2.45 | 2.45 | 2.45 | 2.45 |
| MgO | 5.86 | 5.86 | 5.86 | 5.86 | 5.86 | 5.86 | 5.86 | 5.86 | 5.86 |
| CaO | 0.57 | 0.57 | 0.57 | 0.57 | 0.57 | 0.57 | 0.57 | 0.57 | 0.57 |
| SnO₂ | 0.10 | 0.10 | 0.10 | 0.10 | 0.10 | 0.10 | 0.10 | 0.2 | 0 |
| CeO₂ | 0.10 | 0.10 | 0.10 | 0.10 | 0.10 | 0.10 | 0.10 | 0 | 0.2 |

TABLE 4a

Compositions of batch materials, expressed in grams, for crucible melts described in Example 4.

| Batch Material | 41 | 42 | 43 | 44 | 45 | 46 | 47 | 48 | 49 |
|---|---|---|---|---|---|---|---|---|---|
| Sand | 584.01 | 564.43 | 564.43 | 584.02 | 564.44 | 558.44 | 584.59 | 519.71 | 584.01 |
| Alumina | 13.55 | 13.59 | 13.58 | 13.54 | 13.58 | 13.44 | 13.67 | 13.71 | 13.55 |
| Soda Ash | 191.49 | 190.94 | 176.68 | 84.28 | 84.00 | 83.18 | 191.49 | 191.41 | 184.36 |
| Sodium Nitrate | 0.00 | 0.00 | 22.87 | 0.00 | 0.00 | 22.65 | 0.00 | 0.00 | 0.00 |
| Magnesia | 32.25 | 32.17 | 32.17 | 32.25 | 32.18 | 31.86 | 32.48 | 0 | 32.25 |
| Limestone | 104.02 | 103.88 | 103.91 | 104.28 | 104.14 | 102.96 | 0 | 104.25 | 104.03 |
| Sodium hydroxide | 0.00 | 0.00 | 0.00 | 81.25 | 81.04 | 80.21* | 0.00 | 0.00 | 0.00 |
| Lime hydrate | 0.00 | 0.00 | 0.00 | 0.00 | 0.00 | 0.00 | 94.99 | 0.00 | 0.00 |
| Talc | 0.00 | 0.00 | 0.00 | 0.00 | 0.00 | 0.00 | 0.00 | 103.47 | 0.00 |
| Tin (IV) Oxide | 0.00 | 20.00 | 20.00 | 0.00 | 20.00 | 20.00 | 0.00 | 0.00 | 0.00 |
| Sodium sulfate | 0.00 | 0.00 | 0.00 | 0.00 | 0.00 | 0.00 | 0.00 | 0.00 | 9.53 |

*CaOH substituted for NaOH

TABLE 4b

Compositions of glasses prepared from crucible melts described in Example 4, expressed in weight percent.

| Composition (wt %) | 41 | 42 | 43 | 44 | 45 | 46 | 47 | 48 | 49 |
|---|---|---|---|---|---|---|---|---|---|
| SiO₂ | 72.94 | 72.75 | 72.75 | 72.94 | 72.75 | 72.00 | 72.94 | 72.86 | 72.46 |
| Al₂O₃ | 1.89 | 1.89 | 1.89 | 1.89 | 1.89 | 1.87 | 1.89 | 1.89 | 1.88 |
| Na₂O | 13.96 | 13.92 | 13.92 | 13.97 | 13.92 | 14.81 | 13.96 | 13.95 | 13.87 |
| MgO | 4.08 | 4.07 | 4.07 | 4.08 | 4.07 | 4.03 | 4.08 | 4.07 | 4.05 |
| CaO | 7.09 | 7.08 | 7.08 | 7.09 | 7.08 | 7.00 | 7.09 | 7.08 | 7.04 |
| SnO₂ | 0.00 | 0.25 | 0.25 | 0.00 | 0.25 | 0.25 | 0.00 | 0.00 | 0.00 |
| SO₃ | 0.00 | 0.00 | 0.00 | 0.00 | 0.00 | 0.00 | 0.00 | 0.00 | 0.67 |
| Fe₂O₃ | 0.04 | 0.04 | 0.04 | 0.04 | 0.04 | 0.04 | 0.05 | 0.15 | 0.04 |

TABLE 4c

Compositions of glasses prepared from crucible melts described in Example 4, expressed in mole percent.

| Composition (mol %) | 41 | 42 | 43 | 44 | 45 | 46 | 47 | 48 | 49 |
|---|---|---|---|---|---|---|---|---|---|
| SiO₂ | 72. | 72. | 72. | 72. | 72. | 72. | 72. | 72. | 72. |
| Al₂O₃ | 1.1 | 1.1 | 1.1 | 1.1 | 1.1 | 1.1 | 1.1 | 1.1 | 1.1 |
| Na₂O (Soda Ash) | 13.4 | 13.4 | 12.4 | 5.9 | 5.9 | 5.9 | 13.4 | 13.4 | 12.9 |
| Na₂O (NaNO₃) | 0 | 0 | 1 | 0 | 0 | 1 | 0 | 0 | 0 |
| MgO | 6 | 6 | 6 | 6 | 6 | 6 | 6 | 0 | 6 |
| CaO | 7.5 | 7.5 | 7.5 | 7.5 | 7.5 | 7.5 | 0 | 7.5 | 7.5 |
| Na₂O | 0 | 0 | 0 | 7.5 | 7.5 | 7.5 | 0 | 0 | 0 |
| CaO | 0 | 0 | 0 | 0 | 0 | 0 | 7.5 | 0 | 0 |
| MgO | 0 | 0 | 0 | 0 | 0 | 0 | 0 | 6 | 0 |

TABLE 4c-continued

Compositions of glasses prepared from crucible melts described in Example 4, expressed in mole percent.

| Composition (mol %) | 41 | 42 | 43 | 44 | 45 | 46 | 47 | 48 | 49 |
|---|---|---|---|---|---|---|---|---|---|
| $SnO_2$ | 0 | 0.1 | 0.1 | 0 | 0.1 | 0.1 | 0 | 0 | 0 |
| $Na_2O$ | 0 | 0 | 0 | 0 | 0 | 0 | 0 | 0 | .5 |

TABLE 5a

Compositions of batch materials, expressed in grams, for crucible melts described in Example 5.

| Batch Material | 51 | 52 | 53 | 54 | 55 | 56 | 57 | 58 | 59 |
|---|---|---|---|---|---|---|---|---|---|
| Sand | 555.02 | 555.04 | 555.06 | 553.96 | 553.92 | 552.82 | 550.55 | 623.69 | 623.73 |
| Alumina | 192.23 | 99.12 | 0 | 0 | 191.84 | 191.54 | 0 | 182.65 | 0 |
| Alumina, hydrated | 0 | 142.40 | 293.98 | 293.37 | 0 | 0 | 291.70 | 0 | 279.33 |
| Magnesia | 14.06 | 14.06 | 14.06 | 13.96 | 13.96 | 13.96 | 13.96 | 29.26 | 29.26 |
| Limestone | 59.39 | 59.39 | 59.39 | 59.39 | 59.39 | 59.21 | 59.02 | 79.24 | 79.24 |
| Strontium carbonate | 5.16 | 5.16 | 5.16 | 5.16 | 5.16 | 5.16 | 5.02 | 29.34 | 29.34 |
| Barium carbonate | 51.92 | 51.92 | 51.92 | 51.79 | 51.79 | 51.79 | 51.53 | 80.48 | 80.48 |
| Lanthanum oxide | 111.63 | 111.63 | 111.63 | 111.42 | 111.42 | 111.22 | 110.72 | 0 | 0 |
| Yttrium oxide | 29.40 | 29.40 | 29.40 | 29.30 | 29.30 | 29.30 | 29.20 | 0 | 0 |
| Tin (IV) Oxide | 2.01 | 2.01 | 2.01 | 3.91 | 3.91 | 5.92 | 1.91 | 2.21 | 2.21 |
| Barium nitrate | 34.32 | 34.32 | 34.32 | 34.15 | 34.15 | 34.15 | 33.97 | 38.61 | 38.61 |
| Boric acid | 0.00 | 0.00 | 0.00 | 0.00 | 0.00 | 0.00 | 0.00 | 22.70 | 22.70 |
| Sodium hydroxide | | | | | | | 9.81 | | |

TABLE 5b

Compositions of glasses prepared from crucible melts described in Example 5, expressed in weight percent.

| Composition (wt %) | 51 | 52 | 53 | 54 | 55 | 56 | 57 | 58 | 59 |
|---|---|---|---|---|---|---|---|---|---|
| $SiO_2$ | 54.74 | 54.74 | 54.74 | 54.65 | 54.64 | 54.52 | 54.31 | 61.45 | 61.45 |
| $Al_2O_3$ | 19.08 | 19.08 | 19.08 | 19.05 | 19.05 | 19.01 | 18.94 | 18.14 | 18.14 |
| MgO | 1.42 | 1.42 | 1.42 | 1.41 | 1.41 | 1.41 | 1.41 | 2.91 | 2.91 |
| CaO | 3.19 | 3.19 | 3.19 | 3.19 | 3.19 | 3.18 | 3.17 | 4.25 | 4.25 |
| SrO | 0.42 | 0.42 | 0.42 | 0.42 | 0.42 | 0.41 | 0.41 | 2.10 | 2.10 |
| BaO | 5.90 | 5.90 | 5.90 | 5.88 | 5.88 | 5.88 | 5.85 | 8.31 | 8.31 |
| $La_2O_3$ | 10.93 | 10.93 | 10.93 | 10.92 | 10.92 | 10.89 | 10.85 | 0.00 | 0.00 |
| $Y_2O_3$ | 2.90 | 2.90 | 2.90 | 2.89 | 2.89 | 2.89 | 2.88 | 0.00 | 0.00 |
| $SnO_2$ | 0.20 | 0.20 | 0.20 | 0.39 | 0.39 | 0.58 | 0.19 | 0.22 | 0.22 |
| $B_2O_3$ | 0.00 | 0.00 | 0.00 | 0.00 | 0.00 | 0.00 | 0.00 | 1.26 | 1.26 |
| $Na_2O$ | 0.00 | 0.00 | 0.00 | 0.00 | 0.00 | 0.00 | 0.79 | 0.00 | 0.00 |
| $Fe_2O_3$ | 0.03 | 0.02 | 0.02 | 0.02 | 0.03 | 0.03 | 0.02 | 0.03 | 0.03 |
| $NO_2$ | 1.19 | 1.19 | 1.19 | 1.18 | 1.18 | 1.18 | 1.17 | 1.33 | 1.33 |
| Cl— | 0.01 | 0.01 | 0.01 | 0.01 | 0.01 | 0.01 | 0.01 | 0.00 | 0.00 |

TABLE 5c

Compositions of glasses prepared from crucible melts described in Example 5, expressed in mole percent.

| Composition (mol %) | 51 | 52 | 53 | 54 | 55 | 56 | 57 | 58 | 59 |
|---|---|---|---|---|---|---|---|---|---|
| $SiO_2$ | 70.86 | 70.86 | 70.86 | 70.86 | 70.86 | 70.86 | 70.86 | 70.6 | 70.6 |
| $Al_2O_3$ | 14.56 | 7.56 | 0 | 0 | 14.56 | 14.56 | 0 | 12.28 | 0 |
| $Al_2O_3$ | 0 | 7 | 14.56 | 14.56 | 0 | 0 | 14.56 | 0 | 12.28 |
| MgO | 2.74 | 2.74 | 2.74 | 2.74 | 2.74 | 2.74 | 2.74 | 4.99 | 4.99 |
| CaO | 4.43 | 4.43 | 4.43 | 4.43 | 4.43 | 4.43 | 4.43 | 5.23 | 5.23 |
| SrO | .31 | .31 | .31 | .31 | .31 | .31 | .31 | 1.40 | 1.40 |
| BaO | 1.99 | 1.99 | 1.99 | 1.99 | 1.99 | 1.99 | 1.99 | 2.74 | 2.74 |
| $La_2O_3$ | 2.61 | 2.61 | 2.61 | 2.61 | 2.61 | 2.61 | 2.61 | 0 | 0 |

TABLE 5c-continued

Compositions of glasses prepared from crucible melts described in Example 5, expressed in mole percent.

| Composition (mol %) | 51 | 52 | 53 | 54 | 55 | 56 | 57 | 58 | 59 |
|---|---|---|---|---|---|---|---|---|---|
| $Y_2O_3$ | 1.00 | 1.00 | 1.00 | 1.00 | 1.00 | 1.00 | 1.00 | 0 | 0 |
| $SnO_2$ | 0.10 | 0.10 | 0.10 | 0.2 | 0.2 | 0.3 | 0.10 | 0.10 | 0.10 |
| BaO | 1 | 1 | 1 | 1 | 1 | 1 | 1 | 1 | 1 |
| $B_2O_3$ | 0 | 0 | 0 | 0 | 0 | 0 | 0 | 1.25 | 1.25 |
| $Na_2O$ | 0 | 0 | 0 | 0 | 0 | 0 | 1 | 0 | 0 |

TABLE 6a1

Compositions of batch materials, expressed in grams, for crucible melts described in Example 6.

| Batch Material | 61 | 62 | 63 | 64 |
|---|---|---|---|---|
| Sand | 608.27 | 616.75 | 568.66 | 609.37 |
| Alumina | 84.32 | 72.69 | 81.04 | 173.87 |
| Boric oxide | 29.38 | 52.59 | 118.86 | 118.76 |
| Soda Ash | 199.39 | 176.49 | 98.95 | 82.7 |
| Potassium carbonate | 46.21 | 40.91 | 23.11 | 23.1 |
| Lithium carbonate | 10.49 | 21.23 | 52.2 | 51.95 |
| Magnesia | 29.26 | 22.14 | −0.13 | −0.14 |
| Limestone | 6.004 | 4.321 | −0.48 | −0.45 |
| Tin (IV) oxide | 0 | 0 | 46 | 0 |
| Arsenic Pentoxide | 0 | 0 | 0 | 6.986 |
| Sodium nitrate | 0 | 0 | 0 | 26.04 |
| Alumina, hydrated | 143.32 | 145 | 142.4 | 0 |

TABLE 6a2

Compositions of batch materials, expressed in grams, for crucible melts described in Example 6.

| Batch Material | 66 | 67 |
|---|---|---|
| Sand | 350.12 | 350.11 |
| Alumina | 0 | 79.05 |
| Alumina, hydrated | 241.72 | 119.71 |
| Boric acid | 116.71 | 116.71 |
| Soda ash | 195.24 | 97.92 |
| Sodium hydroxide | 0 | 73.77 |
| Potassium carbonate | 57.69 | 57.69 |
| Magnesia | 15.07 | 15.07 |
| Limestone | 3.956 | 4.191 |
| Tin (IV) oxide | 230 | 230 |
| Cerium (IV) oxide | 26 | 26 |

TABLE 6b1

Compositions of glasses prepared from crucible melts of batch compositions listed in Table 6a1 and described in Example 6, expressed in weight percent.

| Composition (wt %) | 61 | 62 | 63 | 64 |
|---|---|---|---|---|
| $SiO_2$ | 60.66 | 61.5 | 60.83 | 60.74 |
| $Al_2O_3$ | 17.89 | 16.84 | 17.49 | 17.46 |
| $B_2O_3$ | 2.9 | 5.19 | 11.73 | 11.72 |
| $Na_2O$ | 11.69 | 10.35 | 5.82 | 5.81 |
| $K_2O$ | 3.14 | 2.78 | 1.57 | 1.57 |
| MgO | 0.42 | 0.85 | 2.09 | 2.08 |
| CaO | 2.89 | 2.19 | 0 | 0 |
| $SnO_2$ | 0.39 | 0.29 | 0 | 0 |
| $As_2O_3$ | 0 | 0 | 0.46 | 0 |
| $SO_3$ | 0 | 0 | 0 | 0.6 |
| $Sb_2O_3$ | 0 | 0 | 0 | 0 |
| $Fe_2O_3$ | 0 | 0 | 0 | 0 |
| $H_2O$ | 0.02 | 0.02 | 0.01 | 0.02 |
| Cl— | 0 | 0 | 0 | 0 |

TABLE 6b2

Compositions of glasses prepared from crucible melts of batch compositions listed in Table 6a2 and described in Example 6, expressed in weight percent.

| Composition (wt %) | 65 | 66 |
|---|---|---|
| $SiO_2$ | 60.03 | 60.03 |
| $Al_2O_3$ | 15.77 | 15.77 |
| $B_2O_3$ | 6.58 | 6.58 |
| $Na_2O$ | 11.45 | 11.45 |
| $K_2O$ | 3.92 | 3.92 |
| MgO | 1.49 | 1.49 |
| CaO | 0.26 | 0.26 |
| $SnO_2$ | 0.23 | 0.23 |
| $CeO_2$ | 0.26 | 0.26 |
| $Fe_2O_3$ | 0.01 | 0.01 |
| $H_2O$ | 0 | 0 |
| Cl— | 0 | 0 |

TABLE 6c1

Compositions of glasses prepared from crucible melts of batch compositions listed in Table 6a1 and described in Example 6, expressed in mole percent.

| Composition (mol %) | 61 | 62 | 63 | 64 |
|---|---|---|---|---|
| $SiO_2$ | 66.04 | 66.21 | 66.7 | 66.7 |
| $Al_2O_3$ | 5.48 | 4.68 | 5.3 | 11.3 |
| $B_2O_3$ | 2.72 | 4.82 | 11.1 | 11.1 |
| $Na_2O$ | 12.37 | 10.83 | 6.2 | 5.2 |
| $K_2O$ | 2.18 | 1.91 | 1.1 | 1.1 |
| $Li_2O$ | 0.92 | 1.84 | 4.6 | 4.6 |
| MgO | 4.69 | 3.52 | 0 | 0 |
| $SnO_2$ | 0 | 0 | 0.2 | 0 |
| $As_2O_3$ | 0 | 0 | 0 | 0.2 |
| $Na_2O$ | 0 | 0 | 0 | 1 |
| $Al_2O_3$ | 6 | 6 | 6 | 0 |

TABLE 6c2

Compositions of glasses prepared from crucible melts of batch compositions listed in Table 6a2 and described in Example 6, expressed in mole percent.

| Composition (mol %) | 65 | 66 |
|---|---|---|
| $SiO_2$ | 65.23 | 65.23 |
| $Al_2O_3$ | 0 | 5.1 |
| $Al_2O_3$ | 10.1 | 5 |
| $B_2O_3$ | 6.17 | 6.17 |
| $Na_2O$ | 12.1 | 6.1 |
| $Na_2O$ | 0 | 6 |
| $K_2O$ | 2.72 | 2.72 |
| MgO | 2.41 | 2.41 |
| CaO | 0.3 | 0.3 |
| $SnO_2$ | 0.1 | 0.1 |
| $CeO_2$ | 0.1 | 0.1 |

The invention claimed is:

1. A method of making a silicate glass having a seed concentration of less than about 1 seed/cm$^3$, wherein the method comprises:
    melting at a first temperature a glass batch comprising 60-70 mol % $SiO_2$; 6-14 mol % $Al_2O_3$; 0-3 mol % $B_2O_3$; 0-1 mol % $Li_2O$; 8-18 mol % $Na_2O$; 0-5 mol % $K_2O$; 0-2.5 mol % CaO; above 0 to 3 mol % $ZrO_2$; and a fining agent, wherein 12 mol %≤$Li_2O$ +$Na_2O$+$K_2O$≤20 mol %, and wherein the glass batch comprises less than 50 ppm $As_2O_3$; and
    heating at a second temperature greater than the first temperature for a time sufficient to produce the silicate glass having a seed concentration of less than about 1 seed/cm$^3$,
    wherein the fining agent is selected from the group consisting of $SnO_2$, $CeO_2$, and combinations thereof, and the fining agent comprises from 0-1 mol % $SnO_2$ and 0-1 mol % $CeO_2$ of the glass batch.

2. The method of claim 1 wherein the first temperature is about 1425° C. to about 1550° C. and the second temperature is about 1525° C. to about 1675° C.

3. The method of claim 1 wherein the difference between the second temperature and the first temperature is about 50° C. to about 250° C.

4. The method of claim 3 wherein the difference between the second temperature and the first temperature is about 75° C. to about 100° C.

5. The method of claim 1 wherein the glass batch comprises at least one inorganic compound that acts as of a source of $H_2O$ at a temperature where a melt is formed.

6. The method of claim 1 wherein the glass batch comprises an oxidizer fining agent.

7. The method of claim 1 wherein the glass batch comprises fining agent selected from the group consisting of aluminum hydroxide, sodium hydroxide, or combinations thereof.

8. The method of claim 1 further comprising ion exchanging the silicate glass to achieve a surface compressive stress of at least about 200 MPa and a surface compressive layer having a depth of at least about 30 μm.

9. The method of claim 1 further comprising forming a glass sheet from the silicate glass via down-draw method.

10. The method of claim 1, wherein the glass batch further comprises at least one clay or zeolite.

11. The method of claim 1, wherein the glass batch further comprises aluminum silicate hydroxides, talc, montmorillonitesmectite, and combinations thereof.

12. A method of making a silicate glass having a seed concentration of less than about 1 seed/cm$^3$, wherein the method comprises:
    melting at a first temperature a glass batch comprising 60-70 mol % $SiO_2$; 0-3 mol % $B_2O_3$; 0-1 mol % $Li_2O$; 8-18 mol % $Na_2O$; 0-5 mol % $K_2O$; 0-2.5 mol % CaO; above 0 to 3% mol $ZrO_2$; and a fining agent, wherein 12 mol %<$Li_2O$+$Na_2O$+$K_2O$≤20 mol %, and wherein the glass batch is substantially free of $As_2O_3$; and
    heating at a second temperature greater than the first temperature for a time sufficient to produce the silicate glass having a seed concentration of less than about 1 seed/cm$^3$,
    wherein the fining agent is selected from the group consisting of $SnO_2$, $CeO_2$, and combinations thereof, and the fining agent comprises 0-1 mol % $SnO_2$ and 0-1 mol % $CeO_2$ of the glass batch.

13. The method of claim 12 wherein the first temperature is about 1425° C. to about 1550° C. and the second temperature is about 1525° C. to about 1675° C.

14. The method of claim 12 wherein the difference between the second temperature and the first temperature is about 50° C. to about 250° C.

15. The method of claim 14 wherein the difference between the second temperature and the first temperature is about 75° C. to about 100° C.

16. The method of claim 12 wherein the glass batch comprises at least one inorganic compound that acts as of a source of $H_2O$ at a temperature where a melt is formed.

17. The method of claim 12 wherein the glass batch comprises an oxidizer fining agent.

18. The method of claim 12 wherein the glass batch comprises fining agent selected from the group consisting of aluminum hydroxide, sodium hydroxide, or combinations thereof.

19. The method of claim 12 further comprising ion exchanging the silicate glass to achieve a surface compressive stress of at least about 200 MPa and a surface compressive layer having a depth of at least about 30 μm.

20. The method of claim 12 further comprising forming a glass sheet from the silicate glass via down-draw method.

21. A method of making a silicate glass having a seed concentration of less than about 1 seed/cm$^3$, wherein the method comprises:
    melting at a first temperature a glass batch comprising 60-70 mol % $SiO_2$; 6-14 mol % $Al_2O_3$; 0-15 mol % $B_2O_3$; 0-1 mol % $Li_2O$; 0-20 mol % $Na_2O$; 0-10 mol % $K_2O$; 0-10 mol % CaO; 0-5 mol % $ZrO_2$; wherein 12 mol %≤$Li_2O$+$Na_2O$+$K_2O$≤20 mol %, wherein the glass batch comprises less than 50 ppm $As_2O_3$, wherein the glass batch comprises a fining agent comprising a multivalent metal oxide, an oxidizer, and at least one inorganic compound that acts as of a source of water at a temperature where a melt is formed; and
    heating at a second temperature greater than the first temperature for a time sufficient to produce the silicate glass having a seed concentration of less than about 1 seed/cm$^3$.

22. The method of claim 21 wherein the first temperature is about 1425° C. to about 1550° C. and the second temperature is about 1525° C. to about 1675° C.

23. The method of claim 21 wherein the difference between the second temperature and the first temperature is about 50° C. to about 250° C.

24. The method of claim 23 wherein the difference between the second temperature and the first temperature is about 75° C. to about 100° C.

25. The method of claim 21 wherein the glass batch comprises at least one inorganic compound that acts as of a source of $H_2O$ at a temperature where a melt is formed.

26. The method of claim 21 wherein the glass batch comprises an oxidizer fining agent.

27. The method of claim 21 wherein the glass batch comprises fining agent selected from the group consisting of aluminum hydroxide, sodium hydroxide, or combinations thereof.

28. The method of claim 21 further comprising ion exchanging the silicate glass to achieve a surface compressive stress of at least about 200 MPa and a surface compressive layer having a depth of at least about 30 μm.

29. The method of claim 21 further comprising forming a glass sheet from the silicate glass via down-draw method.

30. The method of claim 21 wherein the multivalent oxide fining agent is selected from the group consisting of $SnO_2$, $CeO_2$, and combinations thereof.

* * * * *

UNITED STATES PATENT AND TRADEMARK OFFICE
CERTIFICATE OF CORRECTION

PATENT NO. : 10,626,042 B2
APPLICATION NO. : 14/730354
DATED : April 21, 2020
INVENTOR(S) : Matthew John Dejneka et al.

It is certified that error appears in the above-identified patent and that said Letters Patent is hereby corrected as shown below:

On the Title Page

Column 2, item (56), other publications, Line 1, delete "gobal" and insert -- global --, therefor.

On page 3, Column 2, item (56), other publications, Line 11, delete "Tecnol." and insert -- Technol. --, therefor.

On page 3, Column 2, item (56), other publications, Line 13, delete "Aluiminosilicates" and insert -- Aluminosilicates --, therefor.

On page 3, Column 2, item (56), other publications, Line 25, delete "Non-Crystaline Solides," and insert -- Non-Crystalline Solids, --, therefor.

On page 4, Column 1, item (56), other publications, Line 31, delete "A12O3" and insert -- Al2O3 --, therefor.

On page 4, Column 1, item (56), other publications, Line 46, delete "Non-Crystaline" and insert -- Non-Crystalline --, therefor.

On page 4, Column 2, item (56), other publications, Line 9, delete "Prikladoni" and insert -- Prikladnoi --, therefor.

On page 4, Column 2, item (56), other publications, Line 27, delete "Joural" and insert -- Journal --, therefor.

On page 4, Column 2, item (56), other publications, Line 33, delete "Voo." and insert -- Vol. --, therefor.

On page 4, Column 2, item (56), other publications, Line 55, delete "Na20-Al203" and insert -- Na2O-Al2O3 --, therefor.

Signed and Sealed this
Twenty-second Day of September, 2020

Andrei Iancu
*Director of the United States Patent and Trademark Office*

CERTIFICATE OF CORRECTION (continued)
U.S. Pat. No. 10,626,042 B2

On page 5, Column 1, item (56), other publications, Line 12, delete "Al2O3" and insert -- Al2O3 --, therefor.

On page 5, Column 1, item (56), other publications, Line 26, delete "P2O5" and insert -- P2O5 --, therefor.

On page 5, Column 1, item (56), other publications, Line 44, delete "Al2O3" and insert -- Al2O3 --, therefor.

On page 5, Column 1, item (56), other publications, Line 57, delete "Geochimicia" and insert -- Geochimica --, therefor.

On page 5, Column 1, item (56), other publications, Line 59, delete "Peralakline" and insert -- Peralkaline --, therefor.

On page 5, Column 2, item (56), other publications, Line 2, delete "Al2O3" and insert -- Al2O3 --, therefor.

On page 5, Column 2, item (56), other publications, Line 12, delete "Al2O3" and insert -- Al2O3 --, therefor.

On page 5, Column 2, item (56), other publications, Line 28, delete "Al2O3" and insert -- Al2O3 --, therefor.

On page 5, Column 2, item (56), other publications, Line 32, delete "Al2O3" and insert -- Al2O3 --, therefor.

On page 5, Column 2, item (56), other publications, Line 38, delete "Al2O3" and insert -- Al2O3 --, therefor.

On page 5, Column 2, item (56), other publications, Line 42, delete "teh" and insert -- the --, therefor.

On page 5, Column 2, item (56), other publications, Line 45, delete "Infared" and insert -- Infrared --, therefor.

On page 6, Column 1, item (56), other publications, Line 18, delete "Matrials" and insert -- Materials --, therefor.

On page 6, Column 1, item (56), other publications, Line 50, delete "Susceptibiity" and insert -- Susceptibility --, therefor.

On page 6, Column 1, item (56), other publications, Line 50, delete "(Conductrd" and insert -- (Conducted --, therefor.

On page 6, Column 1, item (56), other publications, Line 55, delete "Susceptibiity" and insert -- Susceptibility --, therefor.

CERTIFICATE OF CORRECTION (continued)
U.S. Pat. No. 10,626,042 B2

On page 6, Column 1, item (56), other publications, Line 64, delete "Aluminoslilicate" and insert -- Aluminosilicate --, therefor.

On page 6, Column 2, item (56), other publications, Line 9, delete "Al2O3" and insert -- Al2O3 --, therefor.

On page 6, Column 2, item (56), other publications, Line 13, delete "Na2O-Al2O3" and insert -- Na2O-Al2O3 --, therefor.

On page 6, Column 2, item (56), other publications, Line 45, delete "Corrdination" and insert -- Coordination --, therefor.

On page 6, Column 2, item (56), other publications, Line 60, delete "teh" and insert -- the --, therefor.

On page 6, Column 2, item (56), other publications, Line 65, delete "Non-Crystaline" and insert -- Non-Crystalline --, therefor.

On page 6, Column 2, item (56), other publications, Line 66, delete "Alumosilicate," and insert -- Aluminosilicate, --, therefor.

On page 6, Column 2, item (56), other publications, Line 67, delete "Alumoborosilicate" and insert -- Aluminoborosilicate --, therefor.

On page 7, Column 1, item (56), other publications, Line 27, delete "lAl2O3" and insert -- Al2O3 --, therefor.

On page 7, Column 1, item (56), other publications, Line 31, delete "Geoplogy" and insert -- Geology --, therefor.

On page 7, Column 1, item (56), other publications, Line 37, delete "funtion" and insert -- function --, therefor.

On page 7, Column 2, item (56), other publications, Line 1, delete "eospeedometer" and insert -- geospeedometer --, therefor.

On page 7, Column 2, item (56), other publications, Line 13, delete "Charification" and insert -- Clarification --, therefor.

On page 7, Column 2, item (56), other publications, Line 32, delete "Gesellschall," and insert -- Gesellschaft --, therefor.

On page 7, Column 2, item (56), other publications, Line 34, delete "CIP-Einheitsaufnahm," and insert -- CIP-Einheitsaufnahme, --, therefor.

On page 7, Column 2, item (56), other publications, Line 42, delete "CIP-Einheitsaufnahnn," and insert -- CIP-Einheitsaufnahme, --, therefor.

In the Claims

In Column 26, Line 7, Claim 12, delete "0 to 3% mol" and insert -- 0 to 3 mol % --, therefor.

In Column 26, Line 7, Claim 12, after "$ZrO_2$;" insert -- $Al_2O_3$; --.